(12) United States Patent
Wu

(10) Patent No.: US 11,375,567 B2
(45) Date of Patent: Jun. 28, 2022

(54) DATA PROCESSING METHOD, TERMINAL-SIDE DEVICE AND NETWORK-SIDE DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/961,276

(22) PCT Filed: Jan. 4, 2019

(86) PCT No.: PCT/CN2019/070362
§ 371 (c)(1),
(2) Date: Jul. 10, 2020

(87) PCT Pub. No.: WO2019/137304
PCT Pub. Date: Jul. 18, 2019

(65) Prior Publication Data
US 2021/0068186 A1 Mar. 4, 2021

(30) Foreign Application Priority Data
Jan. 10, 2018 (CN) .......................... 201810024421.6

(51) Int. Cl.
*H04W 76/18* (2018.01)
*H04W 28/04* (2009.01)
(Continued)

(52) U.S. Cl.
CPC .......... *H04W 76/18* (2018.02); *H04W 28/04* (2013.01); *H04W 76/19* (2018.02); *H04W 76/27* (2018.02); *H04W 80/02* (2013.01); *H04W 84/18* (2013.01)

(58) Field of Classification Search
CPC ..... H04W 76/18; H04W 76/19; H04W 76/27; H04W 28/04; H04W 80/02; H04W 84/18;
(Continued)

(56) References Cited

U.S. PATENT DOCUMENTS

2018/0279401 A1* 9/2018 Hong .................... H04W 76/34
2019/0104562 A1* 4/2019 Tsai .................... H04W 28/065
(Continued)

FOREIGN PATENT DOCUMENTS

| CN | 104427566 A | 3/2015 |
|---|---|---|
| CN | 104581810 A | 4/2015 |
| WO | 2015117457 A1 | 8/2015 |

OTHER PUBLICATIONS

International Preliminary Report on Patentability and Written Opinion dated Jul. 23, 2020 issued in PCT/CN2019/070362.
(Continued)

*Primary Examiner* — Harry H Kim
(74) *Attorney, Agent, or Firm* — Brooks Kushman P.C.

(57) ABSTRACT

A data processing method, a terminal-side device and a network-side device are provided. The data processing method applied to a terminal-side device includes: obtaining configuration information, wherein the configuration information is used for indicating that information is to be reported when a secondary cell failure occurs; when a secondary cell failure occurs in a radio bearer of the terminal-side device, reporting relevant information of the secondary cell failure to a network-side device. The method further includes processing a bearer and a cell corresponding to a Radio Link Control (RLC) entity to which the secondary cell failure occurs.

18 Claims, 8 Drawing Sheets

(51) Int. Cl.
*H04W 76/19* (2018.01)
*H04W 76/27* (2018.01)
*H04W 80/02* (2009.01)
*H04W 84/18* (2009.01)
*H04W 76/15* (2018.01)
*H04W 24/10* (2009.01)
*H04W 36/00* (2009.01)
*H04L 41/0631* (2022.01)
*H04L 41/0803* (2022.01)

(58) Field of Classification Search
CPC . H04W 76/15; H04W 36/0069; H04W 24/10; H04L 41/0631; H04L 41/0803
See application file for complete search history.

(56) References Cited

U.S. PATENT DOCUMENTS

2020/0267793 A1* 8/2020 Sharma ................ H04W 28/02
2021/0195444 A1* 6/2021 Teyeb .................. H04W 76/15

OTHER PUBLICATIONS

3GPP TSG-RAN WG2 Meeting #100, R2-1713000, Reno, USA, Nov. 27-Dec. 1, 2017, "UE behavior upon SCell-failure of PDCP duplication", 4 pages.
3GPP TSG-RAN WG2 Meeting #100, R2-1713009, Reno, USA, Nov. 27-Dec. 1, 2017, "UE layer-2 behaviors at SCell-failure", 3 pages.

* cited by examiner

DATA PROCESSING METHOD, TERMINAL-SIDE DEVICE AND NETWORK-SIDE DEVICE

CROSS-REFERENCE TO RELATED APPLICATION

This application is a U.S. national phase application of a PCT Application No. PCT/CN2019/070362 filed on Jan. 4, 2019, which claims a priority to Chinese Patent Application No. 201810024421.6 filed in China on Jan. 10, 2018, the disclosures of which are incorporated in their entirety by reference herein.

TECHNICAL FIELD

The present application relates to the field of communications technology, in particular to a data processing method, a terminal-side device and a network-side device.

BACKGROUND

In a fifth-Generation (5G) system, a network-side device can configure whether a packet data convergence protocol (Packet Data Convergence Protocol, PDCP) layer of a radio bear (Radio Bear, RB) of a terminal-side device needs to duplicate data of a PDCP entity and send the data and the duplicated data over two or more different paths (e.g., two different Radio Link Control (RLC) entities), respectively.

Bearer types of a PDCP data duplication function may include two types: a Split bearer and a Duplicate bearer (or a bearer configured with a carrier aggregation duplication function), wherein, the PDCP entity corresponding to the Split bear is in one cell group and corresponding two (or more) RLC entities and two (or more) MAC entities are in different cell groups; the PDCP entity, two (or more) RLC entities and one MAC entity corresponding to the Duplicate bear are in the same cell group. Data from different RLC entities are transmitted through different cells, which may be a secondary cell (Secondary Cell, SCell) or a primary cell (Primary Cell, PCell).

In an RLC Acknowledged Mode (AM), a receiving end sends an RLC STATU PDU information to a sending end, and can feed back, to the sending end through the RLC STATU PDU information, whether target data is received or not, and for not reception, fed back by the receiving end, of a data packet, the sending end may perform data retransmission, and generally, the network-side device will configure the maximum number of retransmissions of a data packet for the RLC layer; and for the Duplicate bear, if the maximum number of retransmissions is reached, for an RLC entity configured to perform transmission only on the Secondary Cell, the terminal-side device usually does not trigger RRC connection re-establishment processing, but reports a signaling transmission failure of the RLC to the network-side device.

However, in a case where a radio bearer (i.e., a signaling radio bearer (SRB) or a data radio bearer (DRB)) of the terminal-side device uses the Duplicate bearer and is configured with a packet data convergence protocol (PDCP) duplication, and a target Radio Link Control (RLC) entity of the terminal-side device is configured to transmit only on a corresponding secondary cell, and if a signaling or data transmission failure occurs in the RLC entity (i.e., a secondary cell failure occurs in a radio bearer of the terminal-side device), how the terminal-side device handles this becomes a problem to be solved.

SUMMARY

In a first aspect, a data processing method applied to a terminal-side device is provided. The method includes: obtaining configuration information, wherein the configuration information is used for indicating that information is to be reported when a secondary cell failure occurs; when a secondary cell failure occurs in a radio bearer of the terminal-side device, reporting relevant information of the secondary cell failure to a network-side device.

In a second aspect, a data processing method applied to a network-side device is provided. The method includes: receiving relevant information of a secondary cell failure reported by a terminal-side device when a secondary cell failure occurs in a radio bearer; performing reconfiguration processing on a secondary cell in which the secondary cell failure occurs.

In a third aspect, a terminal-side device is provided. The terminal-side device includes a configuration-obtaining module, used for obtaining configuration information, wherein the configuration information is used for indicating that information is to be reported when a secondary cell failure occurs; a report-processing module, used for, when a secondary cell failure occurs in a radio bearer of the terminal-side device, reporting relevant information of the secondary cell failure to a network-side device.

In a fourth aspect, a network-side device is provided. The network-side device includes an information receiving module, used for receiving relevant information of a secondary cell failure reported by a terminal-side device when a secondary cell failure occurs in a radio bearer; a reconfiguring module, used for performing reconfiguration processing on a secondary cell in which the secondary cell failure occurs.

In a fifth aspect, a terminal-side device is provided. The terminal-side device includes a storage, a processor, and a computer program stored on the storage and executable by the processor, wherein when the computer program is executed by a processor, the processor implements steps of the method according to the first aspect.

In a sixth aspect, a network-side device is provided. The network-side device includes a storage, a processor, and a computer program stored on the storage and executable by the processor, wherein when the computer program is executed by a processor, the processor implements steps of the method according to the second aspect.

In a seventh aspect, a computer readable storage medium is provided. A computer program stored on the computer readable storage medium, wherein when the computer program is executed by a processor, the processor implements steps of the method according to the first aspect and the second aspect.

BRIEF DESCRIPTION OF THE DRAWINGS

In order to more clearly illustrate an embodiment of the present application or technical solutions in the related art, drawings to be used in description of the embodiments or related art will be briefly described below, and it will be apparent that, the drawings in the following description are only some embodiments described in the present application, and other drawings may be obtained from these drawings without paying creative labor by those of ordinary skill in the art.

DETAILED DESCRIPTION

Figure 1:
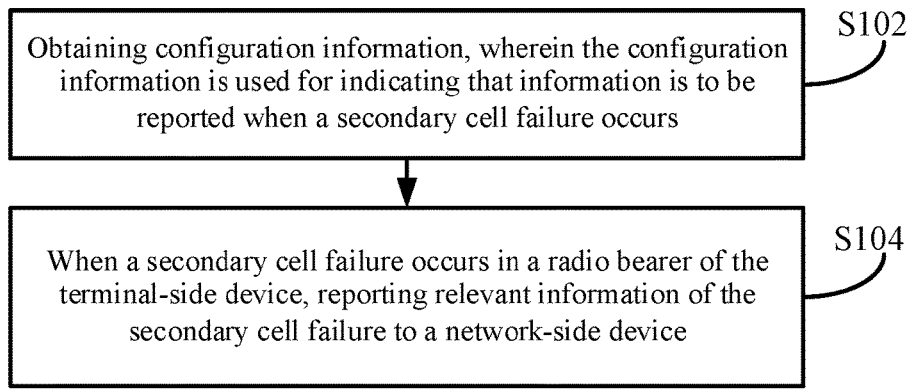
FIG. 1 is an embodiment of a data processing method of the present application.

Embodiments of the present application provide a data processing method, a terminal-side device, and a network-side device.

In order for those skilled in the art to better understand the technical solutions in the present application, the technical solutions in the embodiments of the present application will be clearly and completely described below in conjunction with the drawings in the embodiments of the present application. It is obvious that the described embodiments are only a part, rather than all, of the embodiments of the present application. Based on the embodiments in the present application, all other embodiments obtained by those of ordinary skill in the art without paying creative labor shall be within the protection scope of the present application.

The technical solutions of the present application can be applied to various communications systems, for example, a global system of mobile communication (Global System of Mobile Communication, GSM), a code division multiple access (Code Division Multiple Access, CDMA) system, a wideband code division multiple access (Wideband Code Division Multiple Access, WCDMA), a general packet radio service (General Packet Radio Service, GPRS) system, a long term evolution (Long Term Evolution, LTE) system, etc.

The terminal-side device, also referred to as a user equipment (User Equipment, UE), a mobile terminal (Mobile Terminal), an access terminal, a subscriber unit, a subscriber station, a mobile station, a remote station, a remote terminal, a mobile device, a subscriber terminal, a user terminal, a terminal, a wireless communication device, a user agent or a user device. The access terminal may be a cellular telephone, a cordless telephone, a session initiation protocol (Session Initiation Protocol, SIP) telephone, a wireless local loop (Wireless Local Loop, WLL) station, a personal digital assistant (Personal Digital Assistant, PDA), a handheld device having a wireless communication function, a computing device or other processing device connected to a wireless modem, an in-vehicle device, a wearable device, a terminal device in a future 5G network or a terminal device in a future evolved public land mobile network (Public Land Mobile Network, PLMN).

The network-side device may be a device for communicating with a mobile device, and the network-side device may be a base station (Base Transceiver Station, BTS) in a global system of mobile communication (Global System of Mobile Communication, GSM) or a code division multiple access (Code Division Multiple Access, CDMA); a base station (NodeB, NB) in a wideband code division multiple access (Wideband Code Division Multiple Access, WCDMA) or an eNB in a long term evolution (Long Term Evolution, LTE), or an evolved base station (Evolutional Node B, eNodeB) or an access point, or an in-vehicle device, a wearable device, a network-side device in a future 5G network or a network-side device in a future evolved public land mobile network (Public Land Mobile Network, PLMN).

The system to which the present application is adapted may be a frequency division duplex (Frequency Division Duplex, FDD) system, a time division duplex (Time Division Duplex, TDD) system, or a system in which two duplex modes of the FDD and the TDD are collectively used, and the present application is not limited thereto.

As shown in FIG. 1, an embodiment of the present application provides a data processing method, which can be applied to processing of failure of signaling or data transmission. An execution entity of the method may be a terminal-side device, wherein the terminal-side device may be a terminal device, and the terminal device may be a mobile terminal device such as a mobile phone, a tablet computer, or a wearable device, the terminal device may also be a terminal device such as a personal computer. In particular, the method may include steps S102-S104.

S102: obtaining configuration information, wherein the configuration information is used for indicating that information is to be reported when a secondary cell failure occurs.

A radio bearer of the terminal-side device uses a Duplicate bear mode and is configured with a packet data convergence protocol (PDCP) duplication, and a target radio link control (RLC) entity of the terminal-side device is configured to transmit only on a corresponding secondary cell. The configuration information may be information pre-stored in the terminal-side device, the configuration information may also be from the network-side device, or may be pre-agreed through a communication protocol. The configuration information may be used to indicate whether the terminal-side device reports information when the secondary cell of the radio bearer fails. Relevant information of a secondary cell failure may include various types, such as a cell identifier of a cell in which the secondary cell failure occurs and/or a cell group identifier of a cell group in which the secondary cell failure occurs.

In implementation, a network-side device can configure whether a packet data convergence protocol (Packet Data Convergence Protocol, PDCP) layer of a radio bear (Radio Bear, RB) of a terminal-side device needs to duplicate data of a PDCP entity and send the data and the duplicated data over two or more different paths (e.g., two different radio link control (Radio Link Control, RLC) entities), respectively. Different RLC entities correspond to different logical channels. The RLC may communicate with a PDCP layer through a service access point (Service Access Point, SAP)

or may communicate with a media access control (Media Access Control, MAC) layer through a logical channel. Each logical channel of each terminal-side device has an RLC entity.

Whether the PDCP data duplication function is started (i.e. activated) or terminated (i.e. deactivated) may be indicated by a medium access control control element (Medium Access Control Control Element, MAC CE). When configuring the PDCP data duplication function of the RB, the network device may configure whether the PDCP data duplication function is started immediately after completing the configuration, and under such a condition, a MAC CE signaling is not required to perform additional activation processing.

Figure 2:
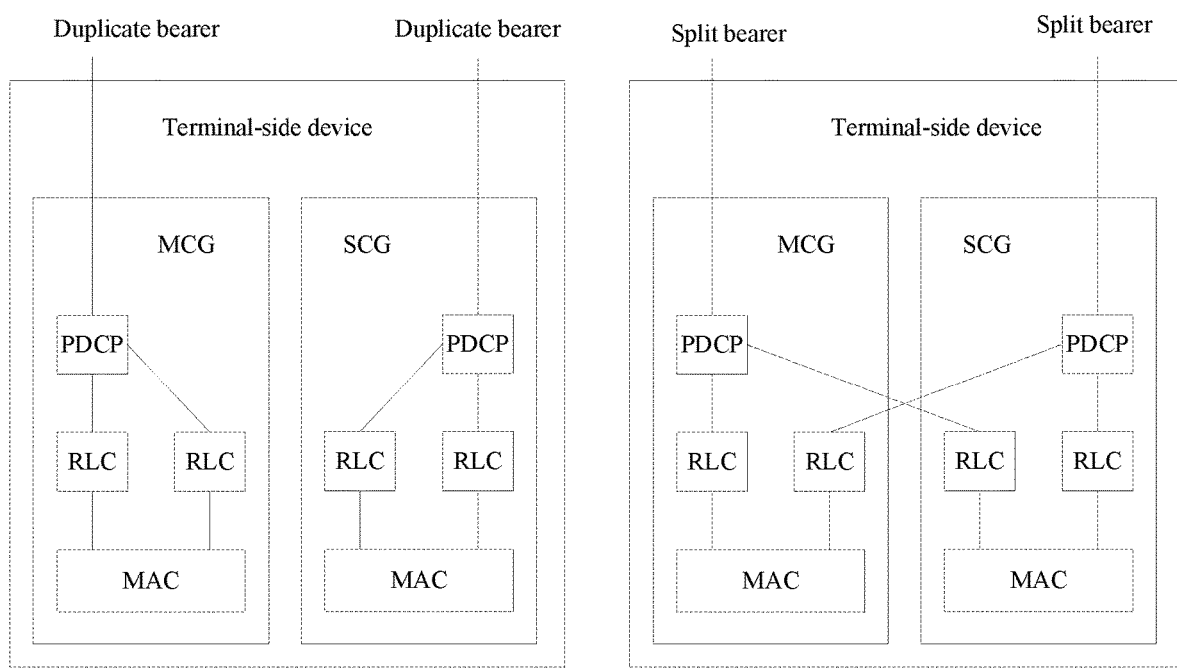
FIG. 2 is a schematic diagram of a bearer type of a PDCP data duplication function of the present application.

In a 5G system, since a Dual Connectivity (DC) architecture is used, two cell groups may be included in the DC architecture, that is, a master cell group (Master Cell Group, MCG) and a secondary cell group (Secondary Cell Group, SCG), wherein, the MCG corresponds to a master node (Master Node, MN) on the network side, and the SCG corresponds to a secondary node (Secondary Node, SN) on the network side. The network-side device may configure a terminal-side device with a plurality of signaling radio bearers (Signaling Radio Bearer, SRB), which may include a SRB1 and a SRB2 configured on the MCG, and a SRB3 configured on the SCG. Bearer types of the PDCP data duplication function may include two types: a Split bear and a Duplicate bear, wherein, as shown in FIG. 2, the PDCP entity corresponding to the Split bear is in one cell group, the corresponding two (or more) RLC entities and two (or more) MAC entities are in different cell groups; as shown in FIG. 2, one PDCP entity, two (or more) RLC entities and one MAC entity corresponding to the Duplicate bear are in the same cell group. Data from different RLC entities is transmitted through different cells, which may be a secondary cell (Secondary Cell, SCell) or a primary cell (Primary Cell, PCell).

In an RLC acknowledged mode (Acknowledged Mode, AM), a receiving end sends an RLC STATU PDU information to a sending end, and can feed back, to the sending end through the RLC STATU PDU information, whether target data is received or not, and for not reception, fed back by the receiving end, of a data packet, the sending end may perform data retransmission, and generally, the network-side device will configure the maximum number of retransmissions of a data packet for the RLC layer; and for the Duplicate bear, if the maximum number of retransmissions is reached, for an RLC entity configured to perform transmission only on the Secondary Cell, the terminal-side device usually does not trigger RRC connection re-establishment processing, but reports a signaling failure of the RLC to the network-side device. Signaling transmission failure of the RLC may include at least one of following: radio link failure of the Secondary Cell Group (SCG); synchronization failure of the Secondary Cell Group (SCG) fails; timing difference of cell uplink transmission in the Secondary Cell Group (SCG) exceeding a predetermined threshold; configuration failure of the Secondary Cell Group (SCG); integrity protection failure of the Secondary Cell Group (SCG) fails, wherein the predetermined threshold value may be the maximum value configured by the network-side device, or may be a required value specified in a communication protocol, or the like.

However, in a case where a radio bearer (i.e., a SRB or a DRB) of the terminal-side device uses the Duplicate bearer and is configured with a Packet Data Convergence Protocol (PDCP) duplication, and a certain Radio Link Control (RLC) entity of a radio bearer of the terminal-side device is configured to transmit only on a corresponding secondary cell, and if a signaling transmission failure occurs in the RLC entity (i.e., a secondary cell failure occurs in a radio bearer of the terminal-side device), it is a problem to be addressed which information needs to be reported to the network-side device by the terminal-side device and which message is used to report the information to the network-side device. For this reason, the embodiment of the present application provides a processing method. The method may specifically include the following: configuration information may be pre-configured for the terminal-side device, wherein the configuration information may be valid in a case where the Signaling Radio Bearer (SRB) or the Data Radio Bearer (DRB) of the terminal-side device uses the Duplicate bear and is configured with the PDCP duplication and a certain RLC entity of the terminal-side device is configured to transmit only on the corresponding secondary cell, that is, in a case where the terminal-side device monitors the radio bearer of the terminal-side device uses the Duplicate bear and is configured with the PDCP duplication, and a certain RLC entity of the radio bearer of the terminal-side device is configured to transmit only on the corresponding secondary cell, then the configuration information can be obtained from information stored in the terminal-side device. If the configuration information exist in the terminal-side device, content of the configuration information can be analyzed, and if the configuration information indicates that information is to be reported when the secondary cell fails, a signaling or data transmission process of an RLC entity corresponding to the terminal-side device may be monitored.

S104: when a secondary cell failure occurs in a radio bearer of the terminal-side device, reporting relevant information of the secondary cell failure to the network-side device.

In an embodiment, when a secondary cell failure occurs in the radio bearer of the terminal-side device, relevant information of the secondary cell failure is reported to the network-side device, and a bearer and a cell corresponding to a Radio Link Control (RLC) entity to which the secondary cell failure occurs are processed.

In an implementation, if the radio bearer of the terminal-side device is monitored to have a secondary cell failure (i.e., a signaling transmission failure or a data transmission failure of the RLC entity), the terminal-side device may collect relevant information of the secondary cell failure, the relevant information may include a cell identifier of a cell in which the secondary cell failure occurs and/or a cell group identifier of a cell group in which the secondary cell failure occurs, etc., and the terminal-side device may send the collected relevant information to the network-side device. Meanwhile, in order to not affect transmission of subsequent signaling or data, the terminal-side device may also process the bearer and the cell corresponding to the RLC entity in which the secondary cell failure occurs, for example, re-establish the RLC entity in which the secondary cell failure occurs and/or deactivate the secondary cell corresponding to the RLC entity in which the secondary cell failure occurs. It should be noted that processing the bearer and the cell corresponding to the RLC entity in which the secondary cell failure occurs may use not only the above two processing modes, but also may use a plurality of processing modes in practical applications, and can be configured according to an actual situation, and the embodiments of the present application are not limited thereto.

Figure 3:
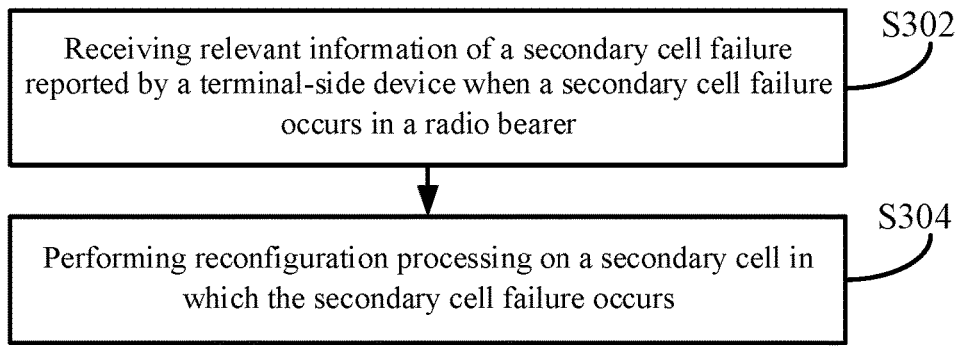
FIG. 3 is an embodiment of another data processing method of the present application.

As shown in FIG. 3, an embodiment of the present application provides a data processing method, which can be applied to processing a signaling or data transmission failure. An execution entity of the method may be a network-side device, wherein the network-side device may be a radio device that performs information transfer with a terminal-side device in a certain radio coverage area, the network-side device may include a device, such as a base station, and the network-side device may further include a plurality of devices, such as in addition to the base station, the network-side device may further include a critical control node (Mobility Management Entity, MME) and/or a serving gateway device or the like. In particular, the method may include steps S302-S304.

S302: receiving relevant information of a secondary cell failure reported by the terminal-side device when the secondary cell failure occurs in a radio bearer.

A specific processing procedure of S302 described above can be obtained by referring to related contents in S102 described above, and will not be described here.

S304: performing reconfiguration processing on a secondary cell in which the secondary cell failure occurs.

In the implementation, after the network-side device receives the relevant information of the secondary cell failure sent by the terminal-side device, the network-side device can be determine that signaling transmission failure occurs in the RLC entity corresponding to the terminal-side device, and in such a case, the network-side device may extract, from the received relevant information, relevant information of the secondary cell in which the secondary cell failure occurs, and may determine, through the extracted information, the secondary cell in which the secondary cell failure occurs, and then reconfigure the secondary cell, such as reconfigure corresponding configuration information for the secondary cell and replace the configuration information of the secondary cell with the reconfigured configuration information, or the configuration information of the secondary cell may be modified, to enable a signaling of the RLC entity corresponding to the terminal-side device to be transmitted continuously. In addition, that network-side device may also send target indication information to the terminal-side device, the target indication information may include a combination of one or more of following: first RRC reconfiguration information after relevant information of the secondary cell failure is reported, an identifier of the recovered RLC entity, a logical channel identifier corresponding to the recovered RLC entity, a bearer identifier corresponding to the recovered RLC entity, a cell identifier corresponding to the recovered RLC entity, and a cell group identifier corresponding to the recovered RLC entity. Through the above-described target indication information, the terminal-side device may be caused to resume data reception or data transmission of the RLC entity in which the secondary cell failure occurred.

An embodiment of the present application provides a data processing method, which is applied to a terminal-side device. If the obtained configuration information indicates that information is to be reported when the secondary cell fails, then when a secondary cell failure occurs in a radio bearer of the terminal-side device, the terminal-side device reports relevant information of the secondary cell failure to the network-side device, and processes a bearer and a cell corresponding to the Radio Link Control (RLC) entity in which the secondary cell failure occurs. In this way, through pre-configuration, the terminal-side device can report information when the secondary cell failure occurs, and process the bearer and the cell corresponding to the Radio Link Control (RLC) entity in which the secondary cell failure occurs, so that the network-side device may obtain relevant information of the secondary cell failure occurred in the radio bearer, whereby subsequent processing can be performed on the secondary cell failure of the radio bearer, and the terminal-side device can stop signal transmission and reception of a cell corresponding to the failed RLC entity. Thus, power and other resources of the terminal-side device can be saved and interference to other terminal-side device can be avoided.

Figure 4:
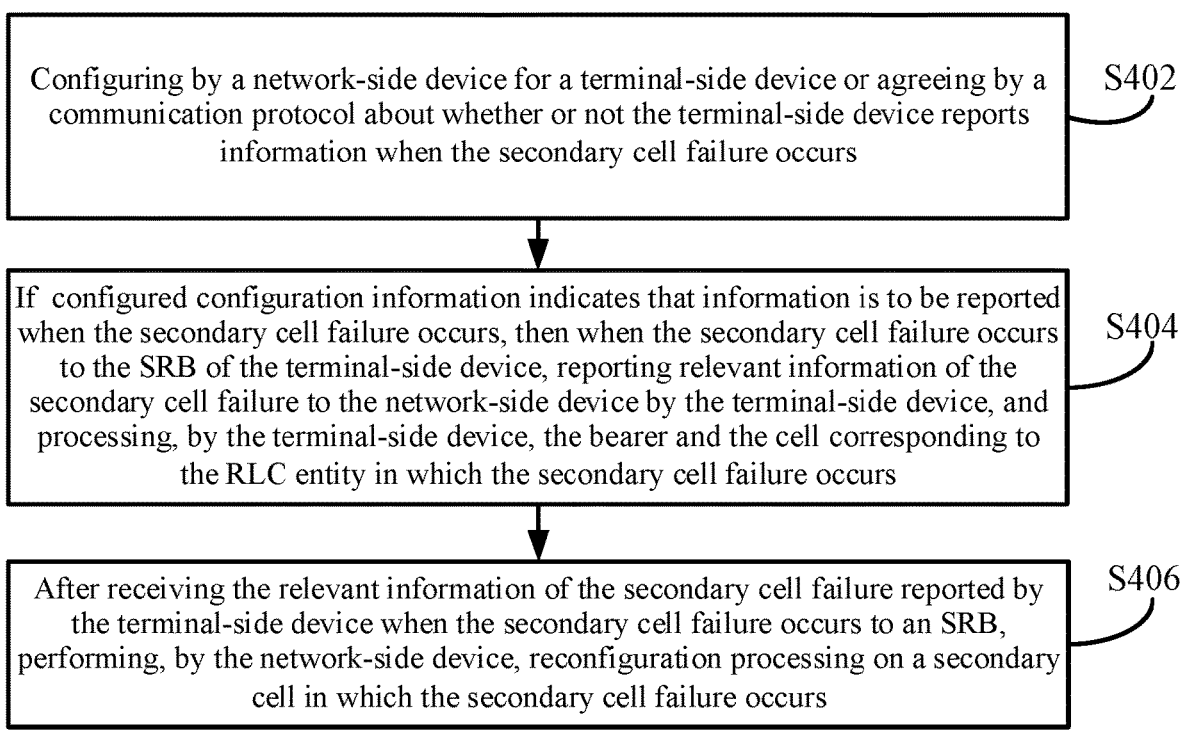
FIG. 4 is an embodiment of another data processing method of the present application.

As shown in FIG. 4, an embodiment of the present application provides a data processing method, which can be applied to processing a signaling or data transmission failure. The method can be realized collectively by a terminal-side device and a network-side device, wherein the terminal-side device can be a terminal device, and the terminal device can be a mobile terminal device such as a mobile phone, a tablet computer or a wearable device, the terminal device may also be a terminal device such as a personal computer. The network-side device may be a radio device that performs information transfer with a terminal-side device in a certain radio coverage area, the network-side device may include a device, such as a base station, the network-side device may also include a plurality of devices, for example, a critical control node (Mobility Management Entity, MME) and/or a serving gateway device or the like, in addition to the base station.

Considering a case where the secondary cell failure occurs to a radio bearer of the terminal-side device, there may be a plurality of different cases. In the following, a case where a secondary cell failure of a Signaling Radio Bearer (SRB) occurs to a Master Cell Group (MCG) of the terminal-side device will be described as an example in detail. It should be noted that a premise of this embodiment is that the SRB of the terminal-side device uses the Duplicate bear and is configured with PDCP duplication, and a certain RLC entity of the SRB of the terminal-side device is configured to transmit only on a corresponding secondary cell. In particular, the method may include following steps S402-S406.

S402: configuring, by the network-side device for the terminal-side device, or agreeing by a communication protocol, about whether or not the terminal-side device reports information when the secondary cell failure occurs.

Figure 5:
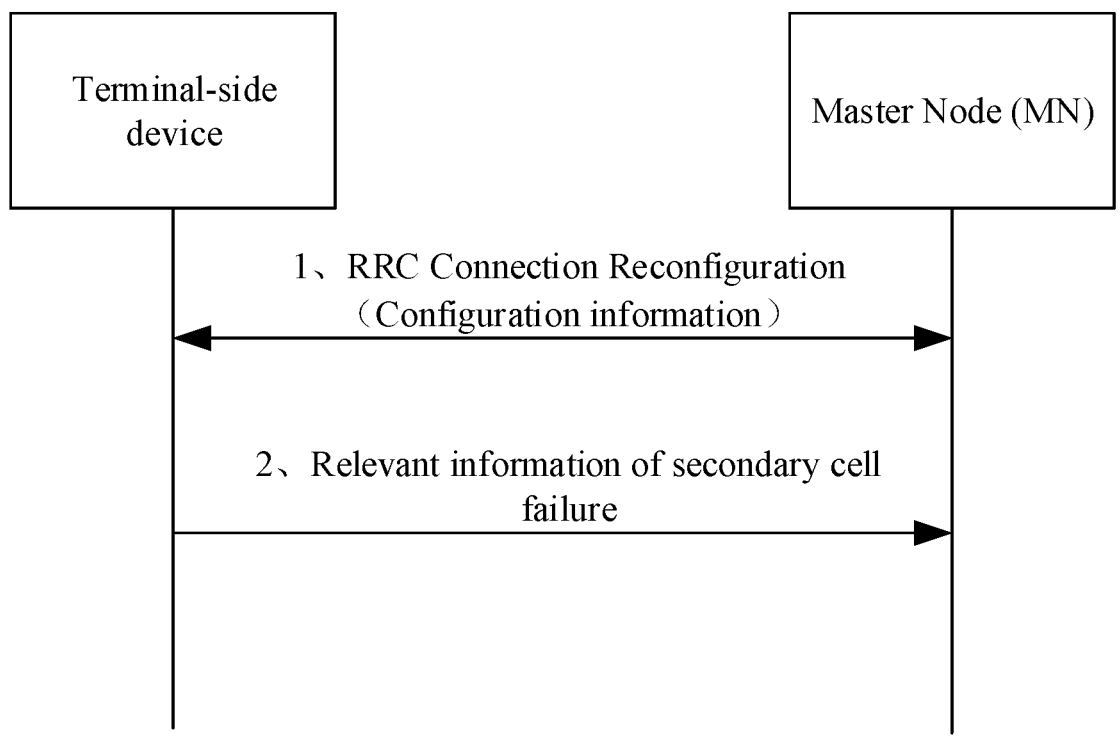
FIG. 5 is a schematic diagram of interaction between a terminal-side device and a master node in the present application.

In implementation, as shown in FIG. 5, since the Master Cell Group of the terminal-side device corresponds to a Master Node, the network-side device may be the master node (MN), the Master Node and the terminal-side device may use an RRC connection reconfiguration (i.e. an RRC connection reconfiguration), in other words, the master node configures, through the RRC Connection Reconfiguration, information about whether the terminal-side device reports information when the secondary cell failure occurs, wherein the RRC connection reconfiguration message may include configuration information about whether to report information when the secondary cell failure occurs. After the terminal-side device receives the RRC connection reconfiguration message sent by the network-side device, the terminal-side device may execute configuration items in the RRC connection reconfiguration message. If all of the configuration items can be successfully executed, the terminal-side device may send an RRC Connection Complete message to the network-side device to complete the RRC connection reconfiguration. In the above manner, information (i.e., configuration information) about whether to report information when the secondary cell failure occurs may be configured on the terminal-side device.

S404: if the configured configuration information indicates that information is to be reported when the secondary cell failure occurs, then when the secondary cell failure occurs to the Signaling Radio Bearer (SRB) of the terminal-side device, reporting relevant information of the secondary cell failure to the network-side device by the terminal-side device, and processing, by the terminal-side device, the bearer and the cell corresponding to the Radio Link Control (RLC) entity in which the secondary cell failure occurs.

The specific processing process of S404 can be obtained by referring to e related contents of S102 and S104 in the above embodiment, and will not be described in detail here.

It should be noted that the type of the SRB in which the secondary cell failure occurs may include a combination of one or more of following: SRB0, SRB1, and SRB2. For example, the type of the SRB in which the secondary cell failure occurs is SRB1, or the type of SRB in which the secondary cell failure occurs is SRB1, SRB2, or the like.

The type of a Signaling Radio Bearer (SRB), through which relevant information of the secondary cell failure is reported to the network-side device, may include a combination of one or more of following: SRB0, SRB1, SRB2, and SRB3. For example, the type of the Signaling Radio Bearer (SRB), through which the relevant information of the secondary cell failure is reported to the network-side device, is SRB0; or, the type of the Signaling Radio Bearer (SRB), through which the relevant information of the secondary cell failure is reported to the network-side device, is SRB1, SRB3, and the like.

In addition, the relevant information of the secondary cell failure reported to the network-side device may include a variety of types, a variety of optional information are provided below, i.e., the relevant information of the secondary cell failure may include a combination of one or more of the following: a cell identifier of a cell in which the secondary cell failure occurs; a cell group identifier of a cell group in which the secondary cell failure occurs; a Signaling Radio Bearer (SRB) identifier of a SRB to which the secondary cell failure occurs; a Radio Link Control (RLC) entity identifier of a RLC entity to which the secondary cell failure occurs; and a logical channel identifier corresponding to a Radio Link Control (RLC) entity to which secondary cell failure occurs; a logical channel group identifier of a logical channel corresponding to a Radio Link Control (RLC) entity to which the secondary cell failure occurs; a measurement result of a cell corresponding to a Radio Link Control (RLC) entity to which a secondary cell failure occurs; a measurement result of all cells; a measurement result of a cell of all serving frequencies; a measurement result of a cell in a cell group in which the secondary cell failure occurs; a measurement result of a cell of a serving frequency of a cell group in which a secondary cell failure occurs; a measurement result of a cell having non-serving frequencies.

The measurement result of a cell corresponding to a Radio Link Control (RLC) entity to which a secondary cell failure occurs; the measurement result of all cells; the measurement result of a cell of all serving frequencies; the measurement result of a cell in a cell group in which the secondary cell failure occurs; the measurement result of a cell of a serving frequency of a cell group in which a secondary cell failure occurs; the measurement result of a cell having non-serving frequencies may include any combination of one or more of following: a measurement result of a cell and a measurement result of a beam of a cell.

In a practical application, the relevant information of the secondary cell failure is not limited to the above information, but may also include other information related to the secondary cell failure, and the embodiments of the present application are not limited thereto.

In addition, processing the bearer and the cell corresponding to the Radio Link Control (RLC) entity to which the secondary cell failure occurs is not limited to a related processing procedure in the above S104, and may include a variety of optional processing procedures in practical applications. A variety of optional processing procedures are provided below and may include a combination of one or more of the following: re-establishing a Radio Link Control (RLC) entity to which secondary cell failure occurs; re-establishing a Radio Link Control (RLC) entity corresponding to a secondary cell corresponding to an RLC entity to which a secondary cell failure occurs; deactivating a secondary cell corresponding to a Radio Link Control (RLC) entity to which a secondary cell failure occurs; stopping uplink signal transmission in a secondary cell corresponding to the Radio Link Control (RLC) entity to which the secondary cell failure occurs; stopping downlink signal reception in a secondary cell corresponding to a Radio Link Control (RLC) entity to which the secondary cell failure occurs; deactivating a Packet Data Convergence Protocol (PDCP) data duplication function; if a default transmission path of a Signaling Radio Bearer (SRB) configured with a Packet Data Convergence Protocol (PDCP) data duplication function is a transmission path corresponding to the Radio Link Control (RLC) entity to which the secondary cell failure occurs, modifying the default transmission path as the transmission path corresponding to the Radio Link Control (RLC) entity to which the secondary cell failure has not occurred; if all Radio Link Control (RLC) entities of a Signaling Radio Bearer (SRB) configured with the PDCP data duplication function fail, and all of the Radio Link Control (RLC) entities are configured to transmit on the secondary cell, then suspending the bearer configured with the PDCP data duplication function (i.e., not transmitting data and not receiving data); if all of the Radio Link Control (RLC) entities of the Signaling Radio Bearer (SRB) configured with the PDCP data duplication function fail, and all of the Radio Link Control (RLC) entities are configured to transmit on the secondary cell, then re-establishing a PDCP entity corresponding to a bearer configured with a PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then resetting Media Access Control (MAC) entities corresponding to a bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then triggering a Radio Resource Control (RRC) connection re-establishment process; triggering a Radio Resource Control (RRC) connection re-establishment process; suspending a Radio Link Control (RLC) entity to which a secondary cell failure occurs; first re-establishing the Radio Link Control (RLC) entity to which the secondary cell failure occurs, and then, suspending the Radio Link Control (RLC) entity; suspending the Signaling Radio Bearer (SRB) to which the secondary cell failure occurs; first re-establishing the Signaling Radio Bearer (SRB) to which the secondary cell failure occurs, and then, suspending the Signaling Radio Bearer (SRB); stopping data transmission or reception of the Radio Link Control (RLC) entity to which the secondary cell failure occurs; releasing or deleting the Radio Link Control (RLC) entity to which the secondary cell failure occurs.

S406: after receiving the relevant information of the secondary cell failure reported by the terminal-side device when the secondary cell failure occurs to a Signaling Radio Bearer (SRB), performing, by the network-side device, reconfiguration processing on a secondary cell in which the secondary cell failure occurs.

The specific processing procedure of S406 can be obtained by referring to related contents of S304 in the above embodiment, and will not be described in detail here.

It should be noted that the network-side device may also send target indication information to the terminal-side device, the target indication information may include a combination of one or more of following: a re-establishment indication of an RLC entity to which a secondary cell failure occurs, first RRC reconfiguration information after reporting the relevant information of the secondary cell failure, an identifier of a recovered RLC entity, a logical channel identifier corresponding to a recovered RLC entity, a bearer identifier corresponding to a recovered RLC entity, a cell identifier corresponding to a recovered RLC entity, and a cell group identifier corresponding to a recovered RLC entity. After the terminal-side device receives the target indication information sent by the network-side device, the terminal-side device may resume, according to the target indication information, data reception or data transmission of the RLC entity to which the secondary cell failure occurs. The first RRC reconfiguration information after reporting the relevant information of the secondary cell failure may be configuration information for reconfiguring any entity or device.

An embodiment of the present application provides a data processing method, which is applied to a terminal-side device, wherein if obtained configuration information indicates that information is to be reported when the secondary cell failure occurs, then when a secondary cell failure occurs to a Signaling Radio Bearer (SRB) of a terminal-side device, relevant information of the secondary cell failure is reported to the network-side device, and the bearer and the cell corresponding to the Radio Link Control (RLC) entity to which the secondary cell failure occurs are processed, so that the terminal-side device can be enabled, through pre-configuration, to report information when the secondary cell failure occurs, and process the bearer and the cell corresponding to the Radio Link Control (RLC) entity to which the secondary cell failure occurs, so that the network-side device can obtain the relevant information of the secondary cell failure occurred in the SRB, and subsequent processing can be performed on the secondary cell failure of the SRB, and the terminal-side device can stop signal transmission and reception of the cell corresponding to the failed RLC entity. Thus, a power and other resources of the terminal-side device can be saved and interference to other terminal-side devices can be avoided.

Figure 6:
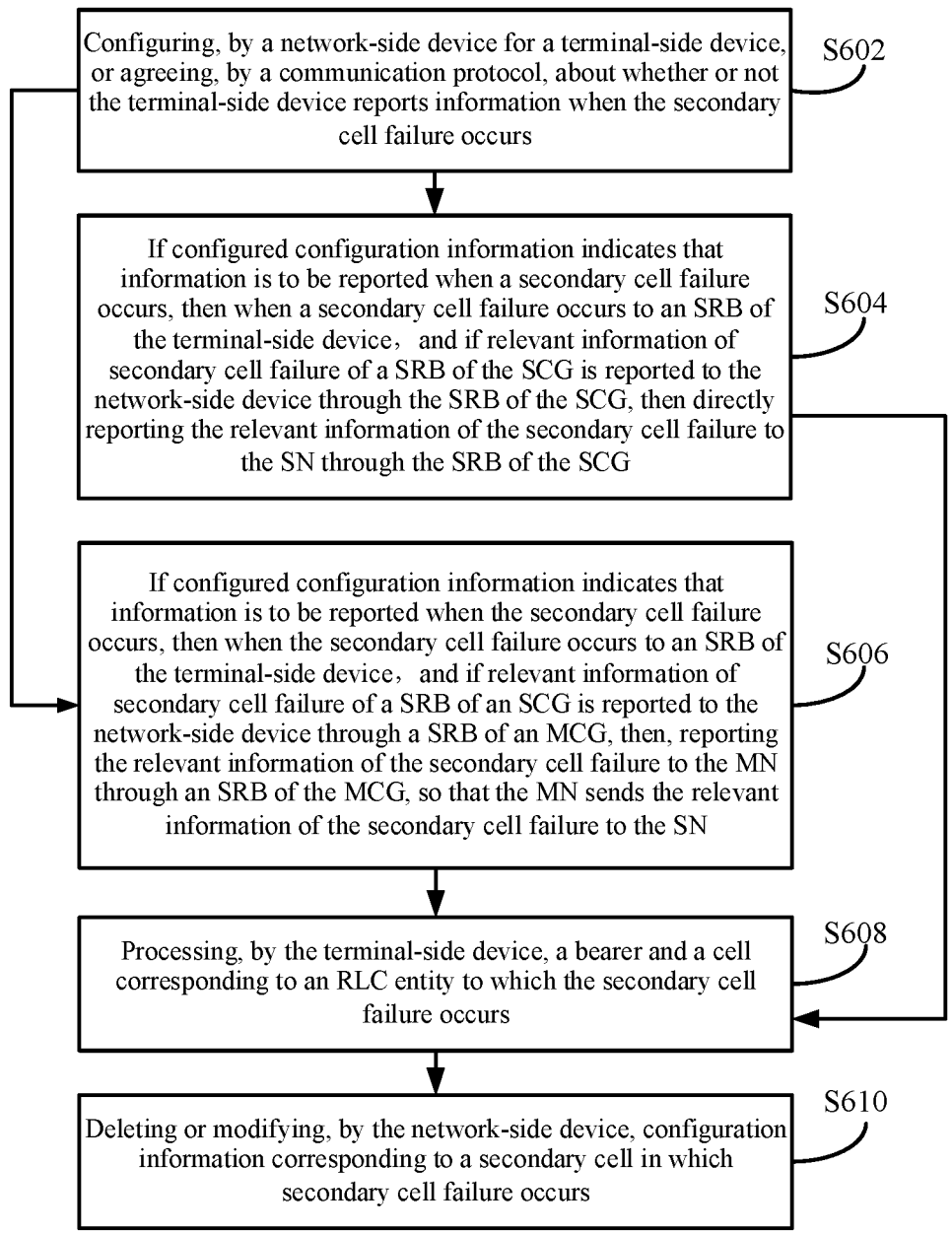
FIG. 6 is an embodiment of another data processing method of the present application.

As shown in FIG. 6, an embodiment of the present application provides a data processing method, which can be applied to processing a signaling transmission failure. The method can be realized collectively by a terminal-side device and a network-side device, wherein the terminal-side device can be a terminal device, and the terminal device can be a mobile terminal device such as a mobile phone, a tablet computer or a wearable device, the terminal device may also be a terminal device such as a personal computer. The network-side device may be a radio device that performs information transfer with a terminal-side device in a certain radio coverage area. The network-side device may include a device, such as a base station, the network-side device may also include a plurality of devices, for example, a critical control node (Mobility Management Entity, MME) and/or a serving gateway device or the like, in addition to the base station.

Considering a case where the secondary cell failure occurs to the Signaling Radio Bearer (SRB) of the terminal-side device, there may be a plurality of different cases. Hereinafter, a case where a secondary cell failure of the Signaling Radio Bearer (SRB) occurs in the Secondary Cell Group (SCG) of the terminal-side device will be described in detail. It should be noted that a premise of this embodiment is that the SRB of the terminal-side device uses the Duplicate bear and is configured with the PDCP duplication, and a certain RLC entity of the SRB of the terminal-side device is configured to transmit only on a corresponding secondary cell. In particular, the method may include following steps S602-S610.

S602: configuring, by the network-side device for the terminal-side device, or agreeing, by a communication protocol, about whether or not the terminal-side device reports information when the secondary cell failure occurs.

Figure 7:
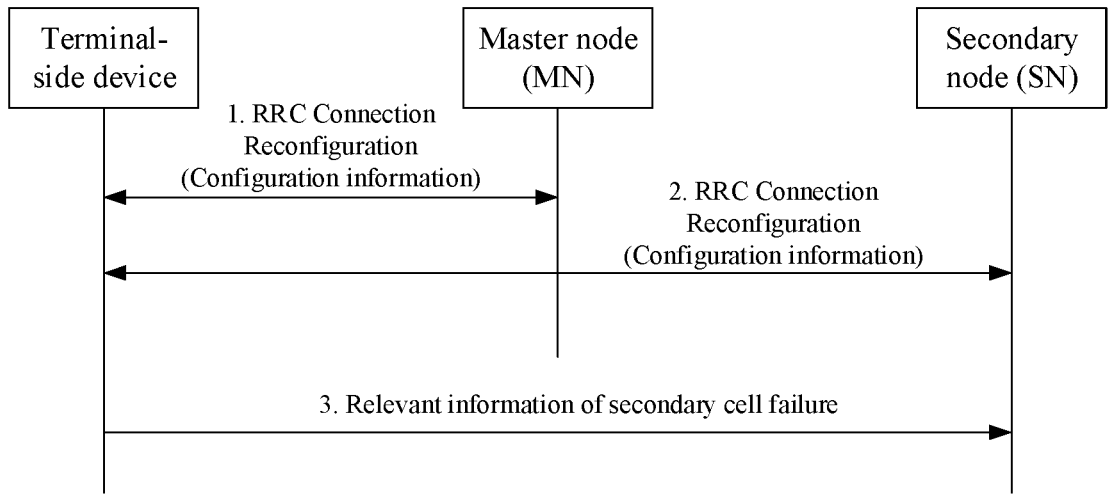
FIG. 7 is a schematic diagram of interaction between a terminal-side device and a master node and a secondary node in the present application.
Figure 8:
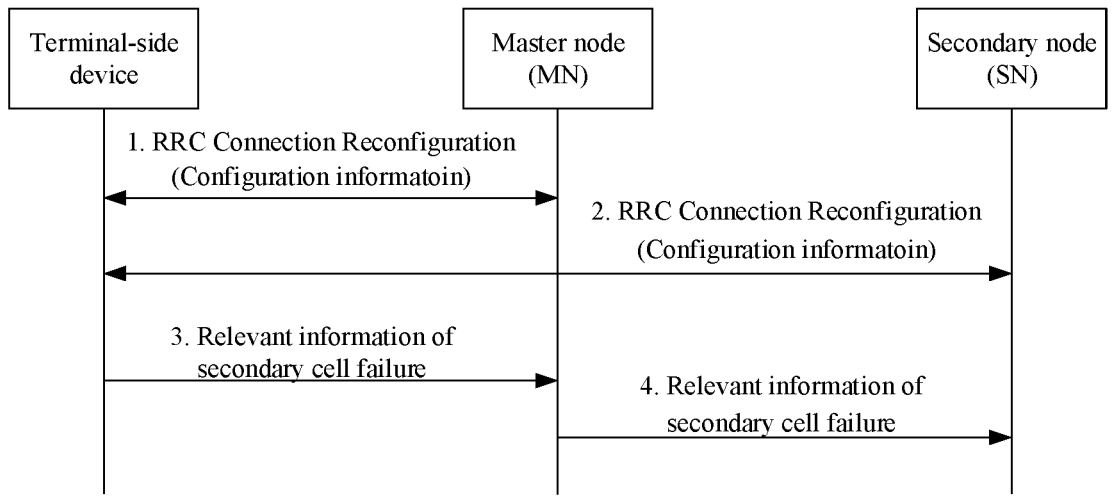
FIG. 8 is a schematic diagram of another interaction among a terminal-side device, a master node, and a secondary node in the present application.

In implementation, as shown in FIG. 7 or FIG. 8, since the Secondary Cell Group of the terminal-side device corresponds to a Secondary Node, the network-side device may be the Secondary Node (SN), an RRC Connection Reconfiguration (i.e. an RRC connection reconfiguration) may be used between a Master Node (MN) and a terminal-side device and a Secondary Node (SN) and the terminal-side device, i.e., the Master Node configures, through the RRC Connection Reconfiguration, information about whether the terminal-side device reports information when the secondary cell failure occurs, and the Secondary Node configures, through the RRC Connection Reconfiguration, information about whether the terminal-side device reports information when the secondary cell failure occurs, wherein the RRC connection reconfiguration message may include configuration information about whether to report information when the secondary cell failure occurs. After the terminal-side device receives the RRC connection reconfiguration message sent by the network-side device, the terminal-side device may execute configuration items in the RRC connection reconfiguration message. If all of the configuration items can be successfully executed, then the terminal-side device may send an RRC Connection Complete message to the network-side device to complete the RRC connection reconfiguration. In the above manner, information (i.e., configuration information) about whether to report information when the secondary cell failure occurs may be configured on the terminal-side device.

Considering that the terminal-side device can report information in two different ways, the two different ways are described respectively in reference to relevant contents in S604 and S606 described below.

S604: if the configured configuration information indicates that information is to be reported when the secondary cell failure occurs, then when the secondary cell failure occurs to the Signaling Radio Bearer (SRB) of the terminal-side device, and if relevant information of secondary cell failure of a Signaling Radio Bearer (SRB) of the Secondary Cell Group (SCG) is reported to the network-side device through the SRB of the SCG, then directly reporting the relevant information of the secondary cell failure to the Secondary Node (SN) through a Signaling Radio Bearer (SRB) of the Secondary Cell Group (SCG).

In the implementation, as shown in FIG. 7, if reporting, by the terminal-side device, the relevant information of the secondary cell failure (i.e., SCell failure) occurring to a SRB in the SCG to the network-side device, is realized by an SRB (i.e., SRB3) of the SCG, then the terminal-side device may directly report the relevant information of the secondary cell failure to the Secondary Node (SN) through the SRB3 without passing through the Master Node (MN).

S606: if the configured configuration information indicates that information is to be reported when the secondary cell failure occurs, then when the secondary cell failure occurs to a Signaling Radio Bearer (SRB) of the terminal-side device, and if relevant information of secondary cell failure of a Signaling Radio Bearer (SRB) of the Secondary Cell Group (SCG) is reported to the network-side device through a SRB of a Master Cell Group (MCG), then, reporting the relevant information of the secondary cell failure to the Master Node (MN) through a Signaling Radio Bearer (SRB) of the MCG, so that the Master Node (MN) sends the relevant information of the secondary cell failure to the Secondary Node (SN).

In implementation, as shown in FIG. 8, if reporting, by the terminal-side device, relevant information of secondary cell failure (i.e., SCell failure) of an SRB occurred in an SCG to the network side is performed through an SRB (such as SRB0 or SRB1 or SRB2) of the MCG, then the terminal-side device may report the relevant information of the secondary cell failure of the SRB occurred in the SCG to the Master Node (MN) through the SRB of the MCG (it should be noted that the relevant information may be carried in SCell Failure Information, the terminal-side device may send the SCell Failure Information to the MN). The MN forwards the relevant information, reported by the terminal-side device, of the secondary cell failure of the SRB occurred in the SCG to the Secondary Node (SN) (it should be noted that, the above-mentioned relevant information can be carried in SCell Failure Information, the SCell Failure Information can be configured in SCG Information, and the terminal-side device can send the SCG Information to the SN).

Here, in terms of contents of S604 and S606 described above, it should be noted that the type of SRB to which the secondary cell failure occurs may include a combination of one or more of following: SRB0, SRB1, SRB2, and SRB3. For example, the type of SRB to which the secondary cell failure occurs is SRB2, or a type of SRB to which the secondary cell failure occurs is SRB1, SRB2, SRB3, or the like.

The type of Signaling Radio Bearer (SRB), through which relevant information of secondary cell failure is reported to the network-side device, may include a combination of one or more of SRB0, SRB1, SRB2, and SRB3. For example, the type of the Signaling Radio Bearer (SRB), through which the relevant information of the secondary cell failure is reported to the network-side device, is SRB3; or, the type of Signaling Radio Bearer (SRB) through which the relevant information of the secondary cell failure is reported to the network-side device, is SRB0, SRB2, SRB3, and the like.

In addition, the relevant information of the secondary cell failure reported to the network-side device may include a variety of types, a variety of optional information are provided below, i.e., the relevant information of the secondary cell failure may include a combination of one or more of the following: a cell identifier of a cell in which the secondary cell failure occurs; a cell group identifier of a cell group in which the secondary cell failure occurs; a Signaling Radio Bearer (SRB) identifier of a SRB to which the secondary cell failure occurs; a Radio Link Control (RLC) entity identifier of a RLC entity to which the secondary cell failure occurs; a logical channel identifier corresponding to a Radio Link Control (RLC) entity to which secondary cell failure occurs; a logical channel group identifier of a logical channel corresponding to a Radio Link Control (RLC) entity to which the secondary cell failure occurs; a measurement result of a cell corresponding to a Radio Link Control (RLC) entity to which a secondary cell failure occurs; a measurement result of all cells; a measurement result of a cell of all serving frequencies; a measurement result of a cell in a cell group in which the secondary cell failure occurs; a measurement result of a cell of a serving frequency of a cell group in which a secondary cell failure occurs; a measurement result of a cell having non-serving frequencies.

The measurement result of a cell corresponding to a Radio Link Control (RLC) entity to which a secondary cell failure occurs; the measurement result of all cells; the measurement result of a cell of all serving frequencies; the measurement result of a cell in a cell group in which the secondary cell failure occurs; the measurement result of a cell of a serving frequency of a cell group in which a secondary cell failure occurs; the measurement result of a cell having non-serving frequencies may include any combination of one or more of following: a measurement result of a cell and a measurement result of a beam of a cell.

In a practical application, the relevant information of the secondary cell failure is not limited to the above information, but may also include other information related to the secondary cell failure, and the embodiments of the present application are not limited thereto.

S608: processing, by the terminal-side device, a bearer and a cell corresponding to a Radio Link Control (RLC) entity to which the secondary cell failure occurs.

In implementation, processing the bearer and the cell corresponding to the Radio Link Control (RLC) entity to which the secondary cell failure occurs is not limited to a related processing procedure in the above S104, and may include a variety of optional processing procedures in practical applications. A variety of optional processing procedures are provided below and may include a combination of one or more of the following: re-establishing a Radio Link Control (RLC) entity to which secondary cell failure occurs; re-establishing a Radio Link Control (RLC) entity corresponding to a secondary cell corresponding to an RLC entity to which a secondary cell failure occurs; deactivating a secondary cell corresponding to a Radio Link Control (RLC) entity to which a secondary cell failure occurs; stopping uplink signal transmission in a secondary cell corresponding to the Radio Link Control (RLC) entity to which the secondary cell failure occurs; stopping downlink signal reception in a secondary cell corresponding to a Radio Link Control (RLC) entity to which the secondary cell failure occurs; deactivating a Packet Data Convergence Protocol (PDCP) data duplication function; if a default transmission path of a Signaling Radio Bearer (SRB) configured with a Packet Data Convergence Protocol (PDCP) data duplication function is a transmission path corresponding to the Radio Link Control (RLC) entity to which the secondary cell failure occurs, modifying the default transmission path as the transmission path corresponding to the Radio Link Control (RLC) entity to which the secondary cell failure has not occurred; if all Radio Link Control (RLC) entities of a Signaling Radio Bearer (SRB) configured with the PDCP data duplication function fail, and all of the Radio Link Control (RLC) entities are configured to transmit on the secondary cell, then suspending the bearer configured with the PDCP data duplication function (i.e., not transmitting data and not receiving data); if all of the Radio Link Control (RLC) entities of the Signaling Radio Bearer (SRB) configured with the PDCP data duplication function fail, and all of the Radio Link Control (RLC) entities are configured to transmit on the secondary cell, then re-establishing a PDCP entity corresponding to a bearer configured with a PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then resetting Media Access Control (MAC) entities corresponding to a bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then triggering a report process of a Secondary Cell Group (SCG) failure, or reporting the secondary cell failure through the MCG without triggering an RRC connection re-establishment process; triggering report process of SCG failure, or triggering the secondary cell failure through the MCG without triggering a Radio Resource Control (RRC) connection re-establishment process; suspending a Radio Link Control (RLC) entity to which a secondary cell failure occurs; first re-establishing the Radio Link Control (RLC) entity to which the secondary cell failure occurs, and then, suspending the Radio Link Control (RLC) entity; suspending the Signaling Radio Bearer (SRB) to which the secondary cell failure occurs; first re-establishing the Signaling Radio Bearer (SRB) to which the secondary cell failure occurs, and then, suspending the Signaling Radio Bearer (SRB); stopping data transmission or reception of the Radio Link Control (RLC) entity to which the secondary cell failure occurs; releasing or deleting the Radio Link Control (RLC) entity to which the secondary cell failure occurs.

S610: deleting or modifying, by the network-side device, configuration information corresponding to a secondary cell in which secondary cell failure occurs.

The specific processing procedure of S610 can be obtained by referring to the related contents of S406 in the above embodiment, and will not be described in detail here.

It should be noted that the network-side device may also send target indication information to the terminal-side device, the target indication information may include a combination of one or more of following: a re-establishment indication of an RLC entity to which a secondary cell failure occurs, first RRC reconfiguration information after reporting the relevant information of the secondary cell failure, an identifier of a recovered RLC entity, a logical channel identifier corresponding to a recovered RLC entity, a bearer identifier corresponding to a recovered RLC entity, a cell identifier corresponding to a recovered RLC entity, and a cell group identifier corresponding to a recovered RLC entity. After the terminal-side device receives the target indication information sent by the network-side device, the terminal-side device may resume, according to the target indication information, data reception or data transmission of the RLC entity to which the secondary cell failure occurs. The first RRC reconfiguration information after reporting the relevant information of the secondary cell failure may be configuration information for reconfiguring any entity or device.

An embodiment of the present application provides a data processing method, which is applied to a terminal-side device, wherein if obtained configuration information indicates that information is to be reported when the secondary cell failure occurs, then when a secondary cell failure occurs to a Signaling Radio Bearer (SRB) of a terminal-side device, relevant information of the secondary cell failure is reported to the network-side device, and the bearer and the cell corresponding to the Radio Link Control (RLC) entity to which the secondary cell failure occurs are processed, so that the terminal-side device can be enabled, through pre-configuration, to report information when the secondary cell failure occurs, and process the bearer and the cell corresponding to the Radio Link Control (RLC) entity to which the secondary cell failure occurs, so that the network-side device can obtain the relevant information of the secondary cell failure occurred in the SRB, and subsequent processing can be performed on the secondary cell failure of the SRB, and the terminal-side device can stop signal transmission and reception of the cell corresponding to the failed RLC entity. Thus, a power and other resources of the terminal-side device can be saved and interference to other terminal-side devices can be avoided.

Figure 9:
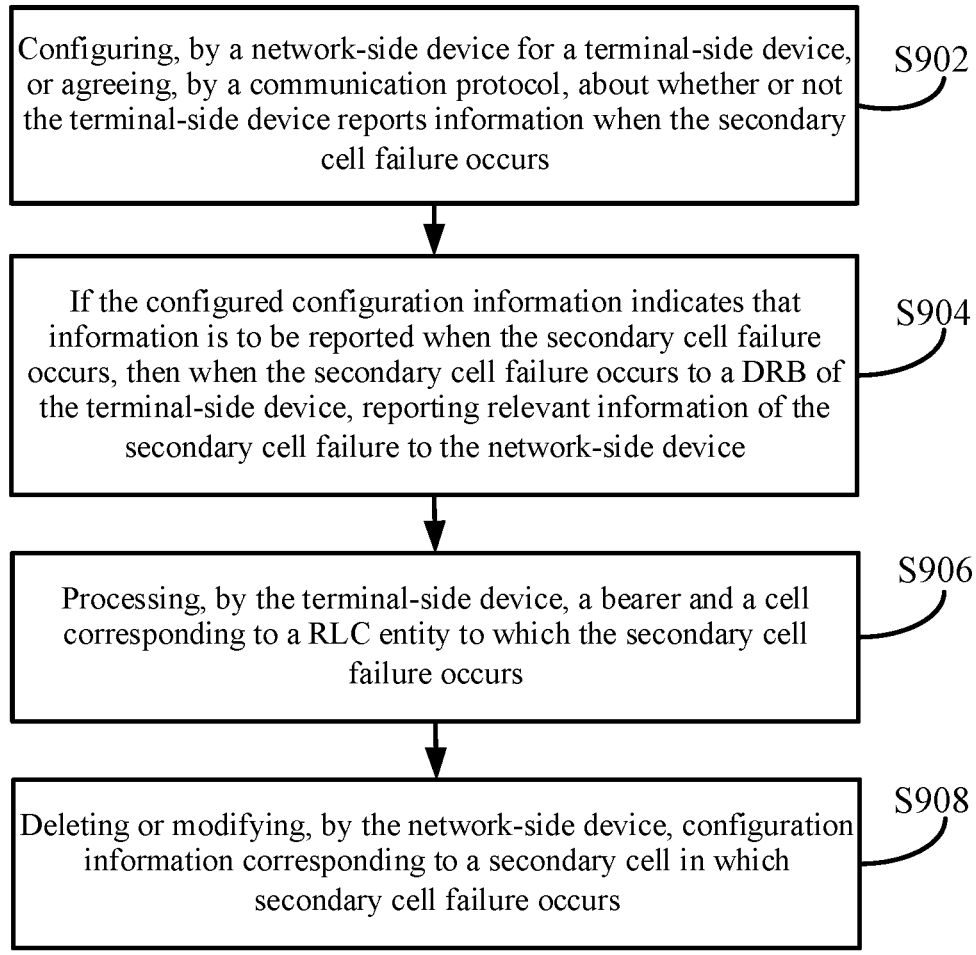
FIG. 9 is an embodiment of another data processing method of the present application.

As shown in FIG. 9, an embodiment of the present application provides a data processing method, which can be applied to processing a transmission failure of a signaling or data. The method can be realized collectively by a terminal-side device and a network-side device, wherein the terminal-side device can be a terminal device, and the terminal device can be a mobile terminal device such as a mobile phone, a tablet computer or a wearable device, the terminal device may also be a terminal device such as a personal computer. The network-side device may be a radio device that performs information transfer with a terminal-side device in a certain radio coverage area. The network-side device may include a device, such as a base station, the network-side device may also include a plurality of devices, for example, a critical control node (Mobility Management Entity, MME) and/or a serving gateway device or the like, in addition to the base station.

Hereinafter, a case where a secondary cell failure of a Data Radio Bearer (DRB) occurs in a Secondary Cell Group (SCG) of the terminal-side device will be described in detail. It should be noted that a premise of this embodiment is that the DRB of the terminal-side device uses the Duplicate bear and is configured with the PDCP duplication, and a certain RLC entity of the DRB of the terminal-side device is configured to transmit only on a corresponding secondary cell. In particular, the method may include following steps S902-S908.

S902: configuring, by the network-side device for the terminal-side device, or agreeing, by a communication protocol, about whether or not the terminal-side device reports information when the secondary cell failure occurs.

The specific processing procedure of S902 can be obtained by referring to the related contents in S402 and S602 in the above embodiment, and will not be described in detail here.

S904: if the configured configuration information indicates that information is to be reported when the secondary cell failure occurs, then when the secondary cell failure occurs to the Data Radio Bearer (DRB) of the terminal-side device, reporting relevant information of the secondary cell failure to the network-side device.

The relevant information of the secondary cell failure reported to the network-side device may include a variety of types, a variety of optional information are provided below, i.e., the relevant information of the secondary cell failure may include a combination of one or more of the following: a cell identifier of a cell in which the secondary cell failure occurs; a cell group identifier of a cell group in which the secondary cell failure occurs; a Data Radio Bearer (DRB) identifier of a DRB to which the secondary cell failure occurs; a Radio Link Control (RLC) entity identifier of a RLC entity to which the secondary cell failure occurs; and a logical channel identifier corresponding to a Radio Link Control (RLC) entity to which secondary cell failure occurs; a logical channel group identifier of a logical channel corresponding to a Radio Link Control (RLC) entity to which the secondary cell failure occurs; a measurement result of a cell corresponding to a Radio Link Control (RLC) entity to which a secondary cell failure occurs; a measurement result of all cells; a measurement result of a cell of all serving frequencies; a measurement result of a cell in a cell group in which the secondary cell failure occurs; a measurement result of a cell of a serving frequency of a cell group in which a secondary cell failure occurs; a measurement result of a cell having non-serving frequencies.

The measurement result of a cell corresponding to a Radio Link Control (RLC) entity to which a secondary cell failure occurs; the measurement result of all cells; the measurement result of a cell of all serving frequencies; the measurement result of a cell in a cell group in which the secondary cell failure occurs; the measurement result of a cell of a serving frequency of a cell group in which a secondary cell failure occurs; the measurement result of a cell having non-serving frequencies may include any combination of one or more of following: a measurement result of a cell and a measurement result of a beam of a cell.

In a practical application, the relevant information of the secondary cell failure is not limited to the above information, but may also include other information related to the secondary cell failure, and the embodiments of the present application are not limited thereto.

S906: processing, by the terminal-side device, a bearer and a cell corresponding to the Radio Link Control (RLC) entity to which the secondary cell failure occurs.

In implementation, processing, by the terminal-side device, the bearer and the cell corresponding to the Radio Link Control (RLC) entity to which the secondary cell failure occurs is not limited to a related processing procedure in the above S104, and may include a variety of optional processing procedures in practical applications. A variety of optional processing procedures are provided below. Specific content of the optional processing procedures may be obtained by referring to related contents provided in the above embodiments, i.e., when a secondary cell failure occurs to a Data Radio Bearer (DRB) of a terminal-side device, a manner in which the terminal-side device processes a bearer and a cell corresponding to the RLC entity is the same as a manner in which the terminal-side device processes a bearer and a cell when a secondary cell failure occurs to a Signaling Radio Bearer (SRB) of the terminal-side device. It should be noted that if a secondary cell failure occurs to a Data Radio Bearer (DRB) of a terminal-side device, then the terminal-side device may processes a bearer and a cell corresponding to a Radio Link Control (RLC) entity to which the secondary cell failure occurs, the processing may include a combination of one or more of the following: suspending a Radio Link Control (RLC) entity to which secondary cell failure occurs; first re-establishing a Radio Link Control (RLC) entity to which a secondary cell failure occurs, and then suspending the Radio Link Control (RLC) entity; suspending a Data Radio Bearer (DRB) to which secondary cell failure occurs; first re-establishing a Data Radio Bearer (DRB) to which a secondary cell failure occurs, and then suspending the Data Radio Bearer (DRB); stopping data transmission or reception of the Radio Link Control (RLC) entity to which the secondary cell failure occurs; releasing or deleting the Radio Link Control (RLC) entity to which the secondary cell failure occurs.

S908: deleting or modifying, by the network-side device, configuration information corresponding to a secondary cell in which secondary cell failure occurs.

The specific processing procedure of S908 can be obtained by referring to the related contents of S406 in the above embodiment, and will not be described in detail here.

It should be noted that the network-side device may also send target indication information to the terminal-side device, the target indication information may include a combination of one or more of following: a re-establishment indication of an RLC entity to which a secondary cell failure occurs, first RRC reconfiguration information after reporting the relevant information of the secondary cell failure, an identifier of a recovered RLC entity, a logical channel identifier corresponding to a recovered RLC entity, a bearer identifier corresponding to a recovered RLC entity, a cell identifier corresponding to a recovered RLC entity, and a cell group identifier corresponding to a recovered RLC entity. After the terminal-side device receives the target indication information sent by the network-side device, the terminal-side device may resume, according to the target indication information, data reception or data transmission of the RLC entity to which the secondary cell failure occurs. The first RRC reconfiguration information after reporting the relevant information of the secondary cell failure may be configuration information for reconfiguring any entity or device.

An embodiment of the present application provides a data processing method, which is applied to a terminal-side device, wherein if obtained configuration information indicates that information is to be reported when the secondary cell failure occurs, then when a secondary cell failure occurs to a Radio Bearer of a terminal-side device, relevant information of the secondary cell failure is reported to the network-side device, and the bearer and the cell corresponding to the Radio Link Control (RLC) entity to which the secondary cell failure occurs are processed, so that the terminal-side device can be enabled, through pre-configuration, to report information when the secondary cell failure occurs, and process the bearer and the cell corresponding to the Radio Link Control (RLC) entity to which the secondary cell failure occurs, so that the network-side device can obtain the relevant information of the secondary cell failure occurred in the DRB, and subsequent processing can be performed on the secondary cell failure of the DRB, and the terminal-side device can stop signal transmission and reception of the cell corresponding to the failed RLC entity. Thus, a power and other resources of the terminal-side device can be saved and interference to other terminal-side devices can be avoided.

Figure 10:
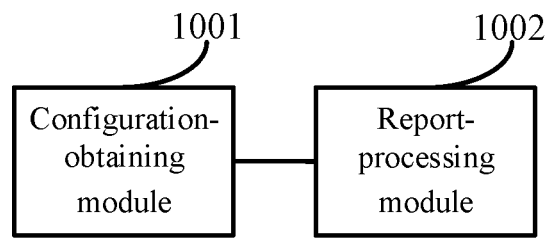
FIG. 10 is an embodiment of a terminal-side device of the present application.

The above are data processing methods provided in the embodiments of the present application. Based on the same concept, an embodiment of the present application also provide a terminal-side device, as shown in FIG. 10.

The terminal-side device may include a configuration-obtaining module 1001 and a report-processing module 1002.

The configuration-obtaining module 1001 is used for obtaining configuration information, wherein the configuration information is used for indicating that information is to be reported when a secondary cell failure occurs.

The report-processing module 1002 is used for, when a secondary cell failure occurs in a radio bearer of the terminal-side device, reporting relevant information of the secondary cell failure to the network-side device.

In an embodiment, the report-processing module 1002 is used for, when a secondary cell failure occurs in the radio bearer of the terminal-side device, reporting relevant information of the secondary cell failure to the network-side device, and processing a bearer and a cell corresponding to a Radio Link Control (RLC) entity to which the secondary cell failure occurs.

Optionally, in the embodiment of the present application, the configuration information is information that is configured by the network-side device or information agreed by a communication protocol about whether information is to be reported when a secondary cell failure occurs.

Optionally, in the embodiment of the present application, the radio bearer to which the secondary cell failure occurs includes a Signaling Radio Bearer (SRB) and/or a Data Radio Bearer (DRB).

Optionally, in the embodiment of the present application, the Signaling Radio Bearer (SRB), to which the secondary cell failure occurs, of the terminal-side device is a Signaling Radio Bearer (SRB), to which the secondary cell failure occurs, in a Master Cell Group (MCG) of the terminal-side device, the report-processing module 1002 is used for: re-establishing a Radio Link Control (RLC) entity to which secondary cell failure occurs; re-establishing a Radio Link Control (RLC) entity corresponding to a secondary cell corresponding to an RLC entity to which a secondary cell failure occurs; deactivating a secondary cell corresponding to a Radio Link Control (RLC) entity to which a secondary cell failure occurs; stopping uplink signal transmission in a secondary cell corresponding to a Radio Link Control (RLC) entity to which the secondary cell failure occurs; stopping downlink signal reception in a secondary cell corresponding to a Radio Link Control (RLC) entity to which the secondary cell failure occurs; deactivating a Packet Data Convergence Protocol (PDCP) data duplication function; if a default transmission path of a Signaling Radio Bearer (SRB) configured with a Packet Data Convergence Protocol (PDCP) data duplication function is a transmission path corresponding to the Radio Link Control (RLC) entity to which the secondary cell failure occurs, modifying the default transmission path as a transmission path corresponding to a Radio Link Control (RLC) entity to which the secondary cell failure has not occurred; if all Radio Link Control (RLC) entities of a Signaling Radio Bearer (SRB) configured with the PDCP data duplication function fail, and all of the Radio Link Control (RLC) entities are configured to transmit on the secondary cell, then suspending the bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then re-establishing a PDCP entity corresponding to a bearer configured with a PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then resetting Media Access Control (MAC) entities corresponding to a bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then triggering a Radio Resource Control (RRC) connection re-establishment process; suspending a Radio Link Control (RLC) entity to which a secondary cell failure occurs; re-establishing the Radio Link Control (RLC) entity to which the secondary cell failure occurs, and suspending the Radio Link Control (RLC) entity; suspending the Signaling Radio Bearer (SRB) to which the secondary cell failure occurs; re-establishing the Signaling Radio Bearer (SRB) to which the secondary cell failure occurs, and, suspending the Signaling Radio Bearer (SRB); stopping data transmission or reception of the Radio Link Control (RLC) entity to which the secondary cell failure occurs; releasing or deleting the Radio Link Control (RLC) entity to which the secondary cell failure occurs.

Optionally, in the embodiment of the present application, the type of Signaling Radio Bearer (SRB) to which the secondary cell failure occurs includes a combination of one or more of SRB0, SRB1, and SRB2.

Optionally, in the embodiment of the present application, the Signaling Radio Bearer (SRB), to which the secondary cell failure occurs, of the terminal-side device is a Signaling Radio Bearer (SRB), to which the secondary cell failure occurs, in a Secondary Cell Group (SCG) of the terminal-side device, the report-processing module 1002 is used for: re-establishing a Radio Link Control (RLC) entity to which secondary cell failure occurs; re-establishing a Radio Link Control (RLC) entity corresponding to a secondary cell corresponding to an RLC entity to which a secondary cell failure occurs; deactivating a secondary cell corresponding to a Radio Link Control (RLC) entity to which a secondary cell failure occurs; stopping uplink signal transmission in a secondary cell corresponding to the Radio Link Control (RLC) entity to which the secondary cell failure occurs; stopping downlink signal reception in a secondary cell corresponding to a Radio Link Control (RLC) entity to which the secondary cell failure occurs; deactivating a Packet Data Convergence Protocol (PDCP) data duplication function; if a default transmission path of a Signaling Radio Bearer (SRB) configured with a Packet Data Convergence Protocol (PDCP) data duplication function is a transmission path corresponding to the Radio Link Control (RLC) entity to which the secondary cell failure occurs, modifying the default transmission path as a transmission path corresponding to the Radio Link Control (RLC) entity to which the secondary cell failure has not occurred; if all Radio Link Control (RLC) entities of a Signaling Radio Bearer (SRB) configured with the PDCP data duplication function fail, and all of the Radio Link Control (RLC) entities are configured to transmit on the secondary cell, then suspending the bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then re-establishing a PDCP entity corresponding to a bearer configured with a PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then resetting Media Access Control (MAC) entities corresponding to a bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then triggering a report process of a Secondary Cell Group (SCG) failure; suspending a Radio Link Control (RLC) entity to which a secondary cell failure occurs; re-establishing the Radio Link Control (RLC) entity to which the secondary cell failure occurs, and, suspending the Radio Link Control (RLC) entity; suspending the Signaling Radio Bearer (SRB) to which the secondary cell failure occurs; re-establishing the Signaling Radio Bearer (SRB) to which the secondary cell failure occurs, and, suspending the Signaling Radio Bearer (SRB); stopping data transmission or reception of the Radio Link Control (RLC) entity to which the secondary cell failure occurs; releasing or deleting the Radio Link Control (RLC) entity to which the secondary cell failure occurs.

Optionally, in an embodiment of the present application, the type of a Signaling Radio Bearer (SRB) to which the secondary cell failure occurs includes a combination of one or more of SRB0, SRB1, SRB2, and SRB3.

Optionally, in the embodiment of the present application, the report-processing module 1002 includes a first report unit and a second report unit.

The first report unit is used for: if relevant information of secondary cell failure of a Signaling Radio Bearer (SRB) of a Secondary Cell Group (SCG) is to be reported to the network-side device through an SRB of the SCG, then directly reporting the relevant information of the secondary cell failure to a Secondary Node (SN) through the SRB of the Secondary Cell Group (SCG).

The second report unit is used for: if relevant information of secondary cell failure of a Signaling Radio Bearer (SRB) of a Secondary Cell Group (SCG) is to be reported to the network-side device through a SRB of a Master Cell Group (MCG), reporting the relevant information of the secondary cell failure to a Master Node (MN) through a Signaling Radio Bearer (SRB) of the MCG, so that the MN sends the relevant information of the secondary cell failure to a Secondary Node (SN).

Optionally, in the embodiment of the present application, a type of a Signaling Radio Bearer (SRB) through which the relevant information of the secondary cell failure is reported to the network-side device includes a combination of one or more of SRB0, SRB1, SRB2, and SRB3.

Optionally, in the embodiment of the present application, the secondary cell failure occurs to a Data Radio Bearer (DRB) of the terminal-side device, and the report-processing module 1002 is used for: suspending a Radio Link Control (RLC) entity to which a secondary cell failure occurs; re-establishing a Radio Link Control (RLC) entity to which a secondary cell failure occurs, and suspending the Radio Link Control (RLC) entity; suspending a Data Radio Bearer (DRB) to which secondary cell failure occurs; re-establishing a Data Radio Bearer (DRB) to which a secondary cell failure occurs, and suspending the Data Radio Bearer (DRB); stopping data transmission or reception of the Radio Link Control (RLC) entity to which the secondary cell failure occurs; releasing or deleting the Radio Link Control (RLC) entity to which the secondary cell failure occurs.

Optionally, in the embodiment of the present application, the relevant information of the secondary cell failure includes a combination of one or more of the following: a cell identifier of a cell in which the secondary cell failure occurs; a cell group identifier of a cell group in which the secondary cell failure occurs; a Radio Bearer (RB) identifier of a RB to which the secondary cell failure occurs; a Radio Link Control (RLC) entity identifier of a RLC entity to which the secondary cell failure occurs; a logical channel identifier corresponding to a Radio Link Control (RLC) entity to which secondary cell failure occurs; a logical channel group identifier of a logical channel corresponding to a Radio Link Control (RLC) entity to which the secondary cell failure occurs; a measurement result of a cell corresponding to a Radio Link Control (RLC) entity to which a secondary cell failure occurs; a measurement result of all cells; a measurement result of a cell in a cell group in which the secondary cell failure occurs; a measurement result of a cell having non-serving frequencies.

Optionally, in the embodiment of the present application, the measurement results include any combination of one or more of the following: a measurement result of a cell and a measurement result of a beam of a cell.

Optionally, the terminal-side device further includes an indication-receiving module and a resuming module.

The indication-receiving module is used for receiving target indication information sent by the network-side device. The resuming module is used for resuming, according to the target indication information, data reception or data transmission of an RLC entity to which the secondary cell failure occurs.

An embodiment of the present application provides a terminal-side device. If acquired configuration information indicates that information is to be reported when the secondary cell failure occurs, then when a secondary cell failure occurs to a Signaling Radio Bearer SRB of a terminal-side device, relevant information of the secondary cell failure is reported to the network-side device, and the bearer and the cell corresponding to the Radio Link Control (RLC) entity to which the secondary cell failure occurs are processed, so that the terminal-side device can be enabled, through pre-configuration, to report information when the secondary cell failure occurs, and process the bearer and the cell corresponding to the Radio Link Control (RLC) entity to which the secondary cell failure occurs, so that the network-side device can obtain the relevant information of the secondary cell failure occurred in the SRB, and subsequent processing can be performed on the secondary cell failure of the SRB, and the terminal-side device can stop signal transmission and reception of the cell corresponding to the failed RLC entity. Thus, a power and other resources of the terminal-side device can be saved and interference to other terminal-side devices can be avoided.

Figure 11:
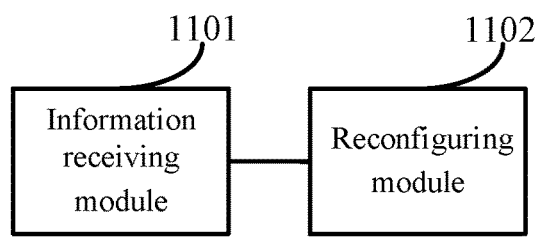
FIG. 11 is an embodiment of another network-side device of the present application.

Based on the same concept, an embodiment of the present application also provides a network-side device, as shown in FIG. 11. The network-side device may include an information receiving module 1101 and a reconfiguring module 1102.

The information receiving module 1101 is used for receiving relevant information of a secondary cell failure reported by the terminal-side device when the secondary cell failure occurs in a radio bearer.

The reconfiguring module 1102 is used for performing reconfiguration processing on a secondary cell in which the secondary cell failure occurs.

Optionally, the network-side device further includes an indication sending module. The indication sending module is used for sending target indication information to the terminal-side device, the target indication information may be used by the terminal-side device to resume data reception or data transmission of an RLC entity to which the secondary cell failure occurs. The target indication information may include a combination of one or more of following: a re-establishment indication of an RLC entity to which a secondary cell failure occurs, first RRC reconfiguration information after reporting the relevant information of the secondary cell failure, an identifier of a recovered RLC entity, a logical channel identifier corresponding to a recovered RLC entity, a bearer identifier corresponding to a recovered RLC entity, a cell identifier corresponding to a recovered RLC entity, and a cell group identifier corresponding to a recovered RLC entity.

An embodiment of the present application provides a network-side device. If the acquired configuration information indicates that information is to be reported when the secondary cell fails, then when a secondary cell failure occurs in a radio bearer of the terminal-side device, the terminal-side device reports relevant information of the secondary cell failure to the network-side device, and processes a bearer and a cell corresponding to the Radio Link Control (RLC) entity in which the secondary cell failure occurs. In this way, through pre-configuration, the terminal-side device can report information when the secondary cell failure occurs, and process the bearer and the cell corresponding to the Radio Link Control (RLC) entity in which the secondary cell failure occurs, so that the network-side device may obtain relevant information of the secondary cell failure occurred in the radio bearer, whereby subsequent processing can be performed on the secondary cell failure of the radio bearer, and the terminal-side device can stop signal transmission and reception of a cell corresponding to the failed RLC entity. Thus, power and other resources of the terminal-side device can be saved and interference to other terminal-side device can be avoided.

Figure 12:
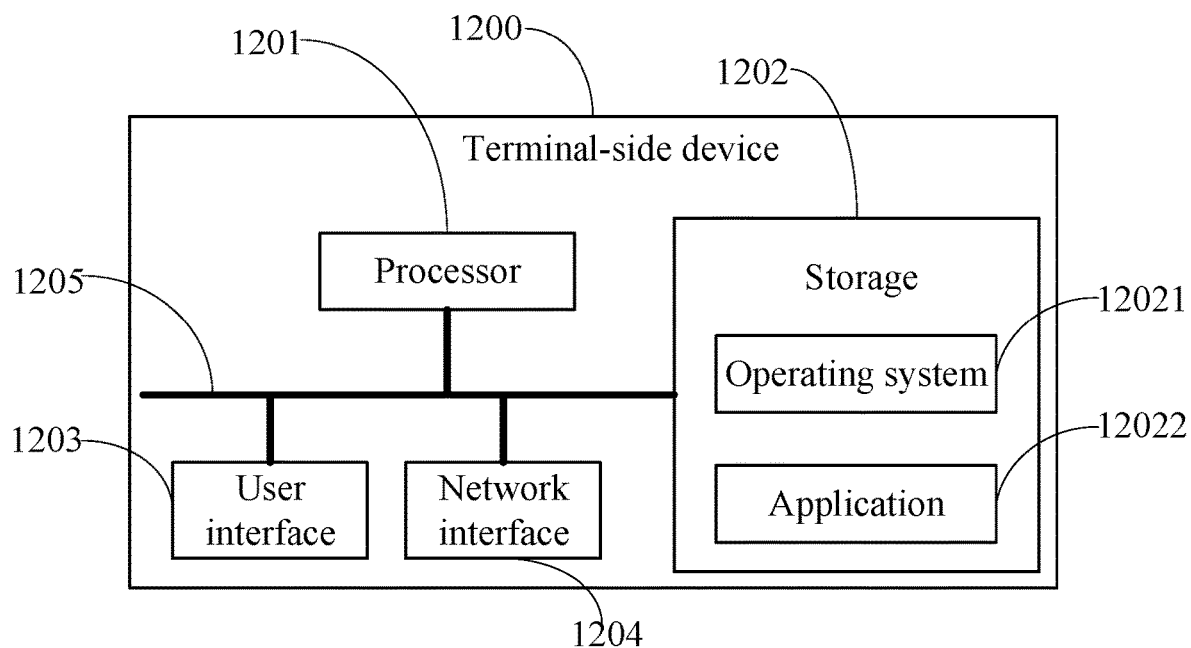
FIG. 12 is an embodiment of a terminal-side device of the present application.

FIG. 12 is a block diagram of a terminal-side device of another embodiment of the present application. The terminal-side device 1200 shown in FIG. 12 includes at least one processor 1201, a storage 1202, at least one network interface 1204, and a user interface 1203. Various components in the terminal-side device 1200 are coupled together by a bus system 1205. It will be appreciated that bus system 1205 is used to enable connection communications among these components. The bus system 1205 includes a data bus, a power bus, a control bus, and a status signal bus. However, for clarity of illustration, various bus are labeled as the bus system 1205 in FIG. 12.

The user interface 1203 may include a display, a keyboard, or a pointing device (e.g., a mouse, a trackball, a touchpad, a touch screen, or the like).

It will be appreciated that the storage 1202 in the embodiments of the present application may be a volatile memory or a non-volatile memory, or may include both the volatile memory and the non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be Random Access Memory (RAM), which serves as an external cache. By way of example but not limitation, many forms of RAMs are available, such as a static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 1202 in the system and the method described by the embodiments of the present application is intended to include, but is not limited to, these and any other suitable types of storages.

In an embodiment, the storage 1202 stores following elements, executable modules or data structures, or a subset thereof, or an extended set thereof: an operating system 12021 and an application 12022.

The operating system 12021 includes various system programs, such as a frame layer, a core library layer, a driver layer, and the like, for implementing various basic services and processing hardware-based tasks. The application 12022 includes various types of applications, such as a Media Player, a Browser, and the like, for implementing various application services. A program implementing the method of embodiments of the present application may be included in the application 12022.

In the embodiment of the present application, the terminal-side device 1200 further includes a computer program stored on the storage 12012 and executable by the processor 1201, wherein when the computer program is executed by the processor 1201, the processor 1201 implements the following steps: obtaining configuration information, wherein the configuration information is used for indicating that information is to be reported when a secondary cell failure occurs; when a secondary cell failure occurs in a radio bearer of the terminal-side device, sending relevant information of the secondary cell failure to the network-side device.

In an embodiment, when the computer program is executed by the processor 1201, the processor 1201 implements the following steps: when a secondary cell failure occurs in the radio bearer of the terminal-side device, reporting relevant information of the secondary cell failure to the network-side device, and processing a bearer and a cell corresponding to a Radio Link Control (RLC) entity to which the secondary cell failure occurs.

The methods disclosed in the embodiments of the present application described above may be applied in or implemented by the processor 1201. The processor 1201 may be an integrated circuit chip having signal processing capability. In an implementation process, the steps of the above-described method may be performed by an integrated logic circuit of hardware in the processor 1201 or performed in a form of software. The processor 1201 may be a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The methods, steps, and logical block diagrams disclosed in the embodiments of the present application may be implemented or performed. The general purpose processor may be a microprocessor or the processor may also be any conventional processor or the like. The steps of the methods disclosed in connection with the embodiments of the present application may be embodied directly as execution by a hardware decoding processor or as execution by a combination of hardware and software modules in the decoding processor. Software modules may be located in computer readable storage media mature in the art such as a random access memory, a flash memory, a read only memory, a programmable read only memory, or an electrically erasable programmable memory, a register, etc. The computer readable storage medium is located in the storage 1202, the processor 1201 reads information in the storage 1202, and performs the steps of the above method in conjunction with hardware thereof. Specifically, a computer program is stored on the computer readable storage medium, and when the computer program is executed by the processor 1201, the steps of the embodiment of the method of the terminal-side device as described above are implemented.

It will be appreciated that the embodiments described herein may be implemented in hardware, software, firmware, middleware, microcode, or a combination thereof. For hardware implementation, a processing unit may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general purpose processor, a controller, a microcontroller, a microprocessor, other electronic units for performing functions described herein, or combinations thereof.

For software implementation, techniques described in the embodiments of the present application may be implemented by means of modules (e.g., processes, functions, etc.) that perform the functions described in embodiments of the present application. Software codes may be stored in a storage and executed by a processor. The storage may be implemented in the processor or external to the processor.

Optionally, when the computer program is executed by the processor 1201, the processor 1201 may also implement following steps.

Optionally, the configuration information is information that is configured by the network-side device, or information agreed by a communication protocol about whether information is to be reported when a secondary cell failure occurs.

Optionally, the radio bearer to which the secondary cell failure occurs includes a Signaling Radio Bearer (SRB) and/or a Data Radio Bearer (DRB).

Optionally, the Signaling Radio Bearer (SRB), to which the secondary cell failure occurs, of the terminal-side device is a Signaling Radio Bearer (SRB), to which the secondary cell failure occurs, in a Master Cell Group (MCG) of the terminal-side device.

Processing the bearer and the cell corresponding to the Radio Link Control (RLC) entity to which the secondary cell failure occurs includes a combination of one or more of following: re-establishing a Radio Link Control (RLC) entity to which a secondary cell failure occurs; re-establishing a Radio Link Control (RLC) entity corresponding to a secondary cell corresponding to an RLC entity to which a secondary cell failure occurs; deactivating a secondary cell corresponding to a Radio Link Control (RLC) entity to which a secondary cell failure occurs; stopping uplink signal transmission in a secondary cell corresponding to a Radio Link Control (RLC) entity to which the secondary cell failure occurs; stopping downlink signal reception in a secondary cell corresponding to a Radio Link Control (RLC) entity to which the secondary cell failure occurs; deactivating a Packet Data Convergence Protocol (PDCP) data duplication function; if a default transmission path of a Signaling Radio Bearer (SRB) configured with a Packet Data Convergence Protocol (PDCP) data duplication function is a transmission path corresponding to the Radio Link Control (RLC) entity to which the secondary cell failure occurs, modifying the default transmission path as a transmission path corresponding to a Radio Link Control (RLC) entity to which the secondary cell failure has not occurred; if all Radio Link Control (RLC) entities of a Signaling Radio Bearer (SRB) configured with the PDCP data duplication function fail, and all of the Radio Link Control (RLC) entities are configured to transmit on the secondary cell, then suspending the bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then re-establishing a PDCP entity corresponding to a bearer configured with a PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then resetting Media Access Control (MAC) entities corresponding to a bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then triggering a Radio Resource Control (RRC) connection re-establishment process; suspending a Radio Link Control (RLC) entity to which a secondary cell failure occurs; re-establishing the Radio Link Control (RLC) entity to which the secondary cell failure occurs, and suspending the Radio Link Control (RLC) entity; suspending the Signaling Radio Bearer (SRB) to which the secondary cell failure occurs; re-establishing the Signaling Radio Bearer (SRB) to which the secondary cell failure occurs, and, suspending the Signaling Radio Bearer (SRB); stopping data transmission or reception of the Radio Link Control (RLC) entity to which the secondary cell failure occurs; releasing or deleting the Radio Link Control (RLC) entity to which the secondary cell failure occurs.

Optionally, the type of a Signaling Radio Bearer (SRB) to which a secondary cell failure occurs includes a combination of one or more of SRB0, SRB1, and SRB2.

Optionally, the Signaling Radio Bearer (SRB), to which the secondary cell failure occurs, of the terminal-side device is a Signaling Radio Bearer (SRB), to which the secondary cell failure occurs, in a Secondary Cell Group (SCG) of the terminal-side device.

Processing the bearer and the cell corresponding to the Radio Link Control (RLC) entity to which the secondary cell failure occurs includes a combination of one or more of following: re-establishing a Radio Link Control (RLC) entity to which a secondary cell failure occurs; re-establishing a Radio Link Control (RLC) entity corresponding to a secondary cell corresponding to an RLC entity to which a secondary cell failure occurs; deactivating a secondary cell corresponding to a Radio Link Control (RLC) entity to which a secondary cell failure occurs; stopping uplink signal transmission in a secondary cell corresponding to the Radio Link Control (RLC) entity to which the secondary cell failure occurs; stopping downlink signal reception in a secondary cell corresponding to a Radio Link Control (RLC) entity to which the secondary cell failure occurs; deactivating a Packet Data Convergence Protocol (PDCP) data duplication function; if a default transmission path of a Signaling Radio Bearer (SRB) configured with a Packet Data Convergence Protocol (PDCP) data duplication function is a transmission path corresponding to the Radio Link Control (RLC) entity to which the secondary cell failure occurs, modifying the default transmission path as a transmission path corresponding to the Radio Link Control (RLC) entity to which the secondary cell failure has not occurred; if all Radio Link Control (RLC) entities of a Signaling Radio Bearer (SRB) configured with the PDCP data duplication function fail, and all of the Radio Link Control (RLC) entities are configured to transmit on the secondary cell, then suspending the bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then re-establishing a PDCP entity corresponding to a bearer configured with a PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then resetting Media Access Control (MAC) entities corresponding to a bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then triggering a report process of a Secondary Cell Group (SCG) failure; suspending a Radio Link Control (RLC) entity to which a secondary cell failure occurs; re-establishing the Radio Link Control (RLC) entity to which the secondary cell failure occurs, and, suspending the Radio Link Control (RLC) entity; suspending the Signaling Radio Bearer (SRB) to which the secondary cell failure occurs; re-establishing the Signaling Radio Bearer (SRB) to which the secondary cell failure occurs, and, suspending the Signaling Radio Bearer (SRB); stopping data transmission or reception of the Radio Link Control (RLC) entity to which the secondary cell failure occurs; releasing or deleting the Radio Link Control (RLC) entity to which the secondary cell failure occurs.

Optionally, the type of a Signaling Radio Bearer (SRB) to which the secondary cell failure occurs includes a combination of one or more of SRB0, SRB1, SRB2, and SRB3.

Optionally, reporting the relevant information of the secondary cell failure to the network-side device by the terminal-side device includes: if relevant information of the secondary cell failure of a Signaling Radio Bearer (SRB) of a Secondary Cell Group (SCG) is to be reported to the network-side device through an SRB of the SCG, then directly reporting the relevant information of the secondary cell failure to a Secondary Node (SN) through the SRB of the SCG; if relevant information of the secondary cell failure of a Signaling Radio Bearer (SRB) of a Secondary Cell Group (SCG) is to be reported to the network-side device through a SRB of a Master Cell Group (MCG), reporting the relevant information of the secondary cell failure to a Master Node (MN) through a Signaling Radio Bearer (SRB) of the MCG, so that the MN sends the relevant information of the secondary cell failure to a Secondary Node (SN).

Optionally, the type of a Signaling Radio Bearer (SRB) through which the relevant information of the secondary cell failure is reported to the network-side device includes a combination of one or more of SRB0, SRB1, SRB2, and SRB3.

Optionally, the secondary cell failure occurs to a Data Radio Bearer (DRB) of the terminal-side device. Processing the bearer and the cell corresponding to the Radio Link Control (RLC) entity to which the secondary cell failure occurs includes a combination of one or more of following: suspending a Radio Link Control (RLC) entity to which a secondary cell failure occurs; re-establishing a Radio Link Control (RLC) entity to which a secondary cell failure occurs, and suspending the Radio Link Control (RLC) entity; suspending a Data Radio Bearer (DRB) to which secondary cell failure occurs; re-establishing a Data Radio Bearer (DRB) to which a secondary cell failure occurs, and suspending the Data Radio Bearer (DRB); stopping data transmission or reception of the Radio Link Control (RLC) entity to which the secondary cell failure occurs; releasing or deleting the Radio Link Control (RLC) entity to which the secondary cell failure occurs.

Optionally, the relevant information of the secondary cell failure includes a combination of one or more of following: a cell identifier of a cell in which the secondary cell failure occurs; a cell group identifier of a cell group in which the secondary cell failure occurs; a Radio Bearer (RB) identifier of a RB to which the secondary cell failure occurs; a Radio Link Control (RLC) entity identifier of a RLC entity to which the secondary cell failure occurs; a logical channel identifier corresponding to a Radio Link Control (RLC) entity to which secondary cell failure occurs; a logical channel group identifier of a logical channel corresponding to a Radio Link Control (RLC) entity to which the secondary cell failure occurs; a measurement result of a cell corresponding to a Radio Link Control (RLC) entity to which a secondary cell failure occurs; a measurement result of all cells; a measurement result of a cell in a cell group in which the secondary cell failure occurs; a measurement result of a cell having non-serving frequencies.

Optionally, the measurement results include any combination of one or more of the following: a measurement result of a cell and a measurement result of a beam of a cell.

Optionally, after reporting the relevant information of the secondary cell failure to the network-side device, the method further includes: receiving target indication information sent by the network-side device; resuming, according to the target indication information, data reception or data transmission of an RLC entity to which the secondary cell failure occurs.

The terminal-side device 1200 can implement various processes implemented by the terminal-side device in the foregoing embodiments, and will not be described here in detail in order to avoid repetition.

An embodiment of the present application provides a terminal-side device. If acquired configuration information indicates that information is to be reported when the secondary cell failure occurs, then when a secondary cell failure occurs to a Signaling Radio Bearer SRB of a terminal-side device, relevant information of the secondary cell failure is reported to the network-side device, and the bearer and the cell corresponding to the Radio Link Control (RLC) entity to which the secondary cell failure occurs are processed, so that the terminal-side device can be enabled, through pre-configuration, to report information when the secondary cell failure occurs, and process the bearer and the cell corresponding to the Radio Link Control (RLC) entity to which the secondary cell failure occurs, so that the network-side device can obtain the relevant information of the secondary cell failure occurred in the SRB, and subsequent processing can be performed on the secondary cell failure of the SRB, and the terminal-side device can stop signal transmission and reception of the cell corresponding to the failed RLC entity. Thus, a power and other resources of the terminal-side device can be saved and interference to other terminal-side devices can be avoided.

Figure 13:
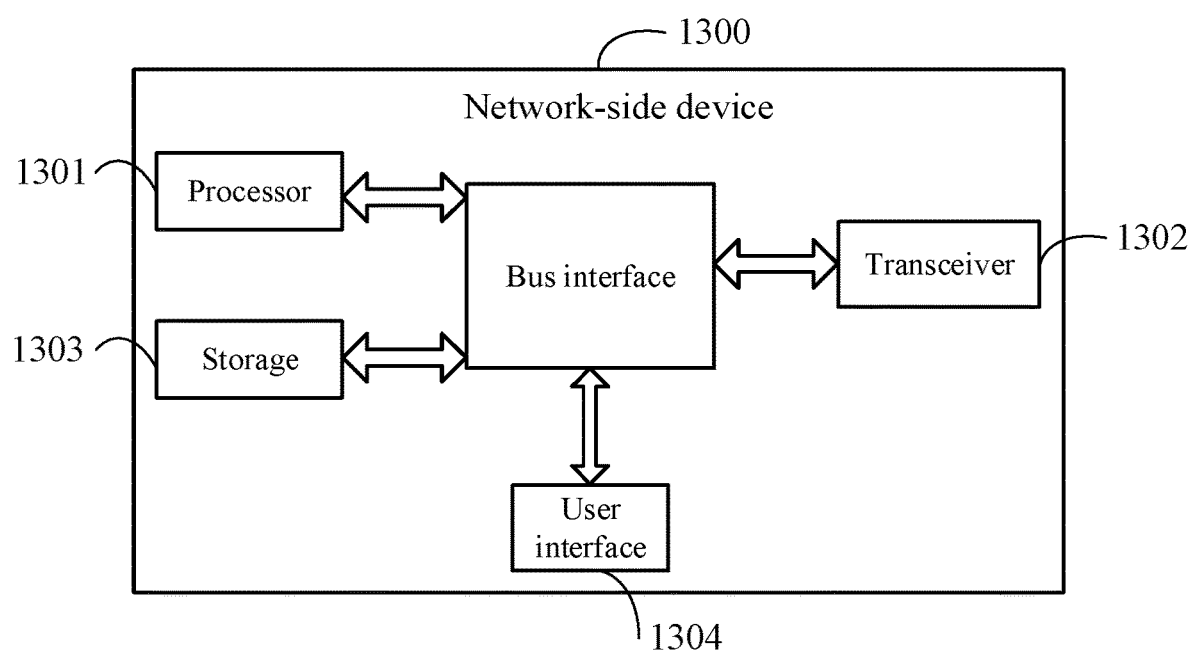
FIG. 13 is an embodiment of a network-side device of the present application.

FIG. 13 is a block diagram of a network-side device according to another embodiment of the present application. The network-side device 1300 shown in FIG. 13 includes at least one processor 1301, a transceiver 1302, a storage 1303, at least one network interface, and a user interface 1304. Various components in the network-side device 1300 are coupled together by a bus system. It will be appreciated that bus system is used to enable connection communications among these components. The bus system includes a data bus, a power bus, a control bus, and a status signal bus.

The user interface 1304 may include a display, a keyboard, or a pointing device (e.g., a mouse, a trackball, a touchpad, a touch screen, or the like).

It will be appreciated that the storage 1303 in the embodiments of the present application may be a volatile memory or a non-volatile memory, or may include both the volatile memory and the non-volatile memory. The non-volatile memory may be a read-only memory (Read-Only Memory, ROM), a programmable ROM (Programmable ROM, PROM), an erasable prom (Erasable PROM, EPROM), an electrically EPROM (Electrically EPROM, EEPROM), or a flash memory. The volatile memory may be a random access memory (Random Access Memory, RAM), which serves as an external cache. By way of example but not limitation, many forms of RAMs are available, such as a static RAM (SRAM), a dynamic RAM (Dynamic RAM, DRAM), a synchronous DRAM (Synchronous DRAM, SDRAM), a double data rate SDRAM (Double Data Rate SDRAM, DDRSDRAM), an enhanced SDRAM (Enhanced SDRAM, ESDRAM), a synchlink DRAM (Synchlink DRAM, SLDRAM) and a direct rambus RAM (Direct Rambus RAM, DRRAM). The storage 1303 in the system and the method described by the embodiments of the present application is intended to include, but is not limited to, these and any other suitable types of storages.

In an embodiment, the storage 1303 stores following elements, executable modules or data structures, or a subset thereof, or an extended set thereof: an operating system and an application.

The operating system includes various system programs, such as a frame layer, a core library layer, a driver layer, and the like, for implementing various basic services and processing hardware-based tasks. The application includes various types of applications, such as a Media Player, a Browser, and the like, for implementing various application services. A program implementing the method of embodiments of the present application may be included in the application.

In an embodiment of the present application, the network-side device 1300 further includes a computer program stored on the storage 1303 and executable by the processor 1301, wherein when the computer program is executed by the processor 1301, the processor 1301 implements the following steps: receiving relevant information of a secondary cell failure reported by a terminal-side device when the secondary cell failure occurs in a radio bearer; performing reconfiguration processing on a secondary cell in which the secondary cell failure occurs.

The methods disclosed in the embodiments of the present application described above may be applied in or implemented by the processor 1301. The processor 1301 may be an integrated circuit chip having signal processing capability. In an implementation process, the steps of the above-described method may be performed by an integrated logic circuit of hardware in the processor 1301 or performed in a form of software. The processor 1301 may be a general purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, discrete gates or transistor logic devices, discrete hardware components. The methods, steps, and logical block diagrams disclosed in the embodiments of the present application may be implemented or performed. The general purpose processor may be a microprocessor or the processor may also be any conventional processor or the like. The steps of the methods disclosed in connection with the embodiments of the present application may be embodied directly as execution by a hardware decoding processor or as execution by a combination of hardware and software modules in the decoding processor. Software modules may be located in computer readable storage media mature in the art such as a random access memory, a flash memory, a read only memory, a programmable read only memory, or an electrically erasable programmable memory, a register, etc. The computer readable storage medium is located in the storage 1302, the processor 1301 reads information in the storage 1302, and performs the steps of the above method in conjunction with hardware thereof. Specifically, a computer program is stored on the computer readable storage medium, and when the computer program is executed by the processor 1301, the steps of the embodiment of the method of the network-side device as described above are implemented.

It will be appreciated that the embodiments described herein may be implemented in hardware, software, firmware, middleware, microcode, or a combination thereof. For hardware implementation, a processing unit may be implemented in one or more application specific integrated circuits (Application Specific Integrated Circuit, ASIC), a digital signal processor (Digital Signal Processor, DSP), a DSP device (DSP Device, DSPD), a programmable logic device (Programmable Logic Device, PLD), a field-programmable gate array (Field-Programmable Gate Array, FPGA), a general purpose processor, a controller, a microcontroller, a microprocessor, other electronic units for performing functions described herein, or combinations thereof.

For software implementation, techniques described in the embodiments of the present application may be implemented by means of modules (e.g., processes, functions, etc.) that perform the functions described in embodiments of the present application. Software codes may be stored in a storage and executed by a processor. The storage may be implemented in the processor or external to the processor.

Optionally, target indication information is sent to the terminal-side device, the target indication information may be used by the terminal-side device to resume data reception or data transmission of an RLC entity to which the secondary cell failure occurs. The target indication information may include a combination of one or more of following: a re-establishment indication of an RLC entity to which a secondary cell failure occurs, first RRC reconfiguration information after reporting the relevant information of the secondary cell failure, an identifier of a recovered RLC entity, a logical channel identifier corresponding to a recovered RLC entity, a bearer identifier corresponding to a recovered RLC entity, a cell identifier corresponding to a recovered RLC entity, and a cell group identifier corresponding to a recovered RLC entity.

The network-side device 1300 can implement various processes implemented by the network-side device in the foregoing embodiments, and will not be described here in detail in order to avoid repetition.

An embodiment of the present application provides a network-side device. If the acquired configuration information indicates that information is to be reported when the secondary cell fails, then when a secondary cell failure occurs in a radio bearer of the terminal-side device, the terminal-side device reports relevant information of the secondary cell failure to the network-side device, and processes a bearer and a cell corresponding to the Radio Link Control (RLC) entity in which the secondary cell failure occurs. In this way, through pre-configuration, the terminal-side device can report information when the secondary cell failure occurs, and process the bearer and the cell corresponding to the Radio Link Control (RLC) entity in which the secondary cell failure occurs, so that the network-side device may obtain relevant information of the secondary cell failure occurred in the radio bearer, whereby subsequent processing can be performed on the secondary cell failure of the radio bearer, and the terminal-side device can stop signal transmission and reception of a cell corresponding to the failed RLC entity. Thus, power and other resources of the terminal-side device can be saved and interference to other terminal-side device can be avoided.

Based on the same concept, an embodiment of the present application also provides a computer readable storage medium. The computer readable storage medium stores one or more programs, wherein when the one or more programs are executed by a terminal including a plurality of application programs to perform processing procedures of FIGS. 1-9, the terminal implements following operations: obtaining configuration information, wherein the configuration information is used for indicating that information is to be reported when a secondary cell failure occurs; and when a secondary cell failure occurs in a radio bearer of the terminal-side device, reporting relevant information of the secondary cell failure to the network-side device.

In an embodiment, when the one or more programs are executed by a terminal including a plurality of application programs, the terminal is caused to perform following operations: obtaining configuration information, wherein the configuration information is used for indicating that information is to be reported when a secondary cell failure occurs; and when a secondary cell failure occurs in a radio bearer of the terminal-side device, reporting relevant information of the secondary cell failure to the network-side device; and processing a bearer and a cell corresponding to a Radio Link Control (RLC) entity to which the secondary cell failure occurs.

Optionally, the configuration information is information that is configured by the network-side device, or information agreed by a communication protocol about whether information is to be reported when a secondary cell failure occurs.

Optionally, the radio bearer to which the secondary cell failure occurs includes a Signaling Radio Bearer (SRB) and/or a Data Radio Bearer (DRB).

Optionally, the Signaling Radio Bearer (SRB), to which the secondary cell failure occurs, of the terminal-side device is a Signaling Radio Bearer (SRB), to which the secondary cell failure occurs, in a Master Cell Group (MCG) of the terminal-side device.

Processing the bearer and the cell corresponding to the Radio Link Control (RLC) entity to which the secondary cell failure occurs includes a combination of one or more of following: re-establishing a Radio Link Control (RLC) entity to which a secondary cell failure occurs; re-establishing a Radio Link Control (RLC) entity corresponding to a secondary cell corresponding to an RLC entity to which a secondary cell failure occurs; deactivating a secondary cell corresponding to a Radio Link Control (RLC) entity to which a secondary cell failure occurs; stopping uplink signal transmission in a secondary cell corresponding to a Radio Link Control (RLC) entity to which the secondary cell failure occurs; stopping downlink signal reception in a secondary cell corresponding to a Radio Link Control (RLC) entity to which the secondary cell failure occurs; deactivating a Packet Data Convergence Protocol (PDCP) data duplication function; if a default transmission path of a Signaling Radio Bearer (SRB) configured with a Packet Data Convergence Protocol (PDCP) data duplication function is a transmission path corresponding to the Radio Link Control (RLC) entity to which the secondary cell failure occurs, modifying the default transmission path as a transmission path corresponding to a Radio Link Control (RLC) entity to which the secondary cell failure has not occurred; if all Radio Link Control (RLC) entities of a Signaling Radio Bearer (SRB) configured with the PDCP data duplication function fail, and all of the Radio Link Control (RLC) entities are configured to transmit on the secondary cell, then suspending the bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then re-establishing a PDCP entity corresponding to a bearer configured with a PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then resetting Media Access Control (MAC) entities corresponding to a bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then triggering a Radio Resource Control (RRC) connection re-establishment process; suspending a Radio Link Control (RLC) entity to which a secondary cell failure occurs; re-establishing the Radio Link Control (RLC) entity to which the secondary cell failure occurs, and suspending the Radio Link Control (RLC) entity; suspending the Signaling Radio Bearer (SRB) to which the secondary cell failure occurs; re-establishing the Signaling Radio Bearer (SRB) to which the secondary cell failure occurs, and, suspending the Signaling Radio Bearer (SRB); stopping data transmission or reception of the Radio Link Control (RLC) entity to which the secondary cell failure occurs; releasing or deleting the Radio Link Control (RLC) entity to which the secondary cell failure occurs.

Optionally, the type of a Signaling Radio Bearer (SRB) to which a secondary cell failure occurs includes a combination of one or more of SRB0, SRB1, and SRB2.

Optionally, the Signaling Radio Bearer (SRB), to which the secondary cell failure occurs, of the terminal-side device is a Signaling Radio Bearer (SRB), to which the secondary cell failure occurs, in a Secondary Cell Group (SCG) of the terminal-side device.

Processing the bearer and the cell corresponding to the Radio Link Control (RLC) entity to which the secondary cell failure occurs includes a combination of one or more of following: re-establishing a Radio Link Control (RLC) entity to which a secondary cell failure occurs; re-establishing a Radio Link Control (RLC) entity corresponding to a secondary cell corresponding to an RLC entity to which a secondary cell failure occurs; deactivating a secondary cell corresponding to a Radio Link Control (RLC) entity to which a secondary cell failure occurs; stopping uplink signal transmission in a secondary cell corresponding to the Radio Link Control (RLC) entity to which the secondary cell failure occurs; stopping downlink signal reception in a secondary cell corresponding to a Radio Link Control (RLC) entity to which the secondary cell failure occurs; deactivating a Packet Data Convergence Protocol (PDCP) data duplication function; if a default transmission path of a Signaling Radio Bearer (SRB) configured with a Packet Data Convergence Protocol (PDCP) data duplication function is a transmission path corresponding to the Radio Link Control (RLC) entity to which the secondary cell failure occurs, modifying the default transmission path as a transmission path corresponding to the Radio Link Control (RLC) entity to which the secondary cell failure has not occurred; if all Radio Link Control (RLC) entities of a Signaling Radio Bearer (SRB) configured with the PDCP data duplication function fail, and all of the Radio Link Control (RLC) entities are configured to transmit on the secondary cell, then suspending the bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then re-establishing a PDCP entity corresponding to a bearer configured with a PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then resetting Media Access Control (MAC) entities corresponding to a bearer configured with the PDCP data duplication function; if all of the Radio Link Control (RLC) entities of the Signaling Radio Bearer (SRB) configured with the PDCP data duplication function fail, and all of the Radio Link Control (RLC) entities are configured to transmit on the secondary cell, then triggering a report process of a Secondary Cell Group (SCG) failure; suspending a Radio Link Control (RLC) entity to which a secondary cell failure occurs; re-establishing the Radio Link Control (RLC) entity to which the secondary cell failure occurs, and, suspending the Radio Link Control (RLC) entity; suspending the Signaling Radio Bearer (SRB) to which the secondary cell failure occurs; re-establishing the Signaling Radio Bearer (SRB) to which the secondary cell failure occurs, and, suspending the Signaling Radio Bearer (SRB); stopping data transmission or reception of the Radio Link Control (RLC) entity to which the secondary cell failure occurs; releasing or deleting the Radio Link Control (RLC) entity to which the secondary cell failure occurs.

Optionally, the type of a Signaling Radio Bearer (SRB) to which the secondary cell failure occurs includes a combination of one or more of SRB0, SRB1, SRB2, and SRB3.

Optionally, reporting the relevant information of the secondary cell failure to the network-side device by the terminal-side device includes: if relevant information of the secondary cell failure of a Signaling Radio Bearer (SRB) of a Secondary Cell Group (SCG) is to be reported to the network-side device through an SRB of the SCG, then directly reporting the relevant information of the secondary cell failure to a Secondary Node (SN) through the SRB of the SCG; if relevant information of the secondary cell failure of a Signaling Radio Bearer (SRB) of a Secondary Cell Group (SCG) is to be reported to the network-side device through a SRB of a Master Cell Group (MCG), reporting the relevant information of the secondary cell failure to a Master Node (MN) through a Signaling Radio Bearer (SRB) of the MCG, so that the MN sends the relevant information of the secondary cell failure to a Secondary Node (SN).

Optionally, the type of a Signaling Radio Bearer (SRB) through which the relevant information of the secondary cell failure is reported to the network-side device includes a combination of one or more of SRB0, SRB1, SRB2, and SRB3.

Optionally, the secondary cell failure occurs to a Data Radio Bearer (DRB) of the terminal-side device. Processing the bearer and the cell corresponding to the Radio Link Control (RLC) entity to which the secondary cell failure occurs includes a combination of one or more of following: suspending a Radio Link Control (RLC) entity to which a secondary cell failure occurs; re-establishing a Radio Link Control (RLC) entity to which a secondary cell failure occurs, and suspending the Radio Link Control (RLC) entity; suspending a Data Radio Bearer (DRB) to which secondary cell failure occurs; re-establishing a Data Radio Bearer (DRB) to which a secondary cell failure occurs, and suspending the Data Radio Bearer (DRB); stopping data transmission or reception of the Radio Link Control (RLC) entity to which the secondary cell failure occurs; releasing or deleting the Radio Link Control (RLC) entity to which the secondary cell failure occurs.

Optionally, the relevant information of the secondary cell failure includes a combination of one or more of following: a cell identifier of a cell in which the secondary cell failure occurs; a cell group identifier of a cell group in which the secondary cell failure occurs; a Radio Bearer (RB) identifier of a RB to which the secondary cell failure occurs; a Radio Link Control (RLC) entity identifier of a RLC entity to which the secondary cell failure occurs; a logical channel identifier corresponding to a Radio Link Control (RLC) entity to which secondary cell failure occurs; a logical channel group identifier of a logical channel corresponding to a Radio Link Control (RLC) entity to which the secondary cell failure occurs; a measurement result of a cell corresponding to a Radio Link Control (RLC) entity to which a secondary cell failure occurs; a measurement result of all cells; a measurement result of a cell in a cell group in which the secondary cell failure occurs; a measurement result of a cell having non-serving frequencies.

Optionally, the measurement results include any combination of one or more of the following: a measurement result of a cell and a measurement result of a beam of a cell.

Optionally, after reporting the relevant information of the secondary cell failure to the network-side device, the method further includes: receiving target indication information sent by the network-side device; resuming, according to the target indication information, data reception or data transmission of an RLC entity to which the secondary cell failure occurs.

The network-side device may also be caused to perform the following operations: receiving relevant information of a secondary cell failure reported by the terminal-side device when the secondary cell failure occurs in a radio bearer; performing reconfiguration processing on a secondary cell in which the secondary cell failure occurs.

Optionally, the network-side device further sends target indication information to the terminal-side device, the target indication information may be used by the terminal-side device to resume data reception or data transmission of an RLC entity to which the secondary cell failure occurs. The target indication information may include a combination of one or more of following: a re-establishment indication of an RLC entity to which a secondary cell failure occurs, first RRC reconfiguration information after reporting the relevant information of the secondary cell failure, an identifier of a recovered RLC entity, a logical channel identifier corresponding to a recovered RLC entity, a bearer identifier corresponding to a recovered RLC entity, a cell identifier corresponding to a recovered RLC entity, and a cell group identifier corresponding to a recovered RLC entity.

An embodiment of the present application provides a computer readable storage medium. If the acquired configuration information indicates that information is to be reported when the secondary cell fails, then when a secondary cell failure occurs in a radio bearer of the terminal-side device, the terminal-side device reports relevant information of the secondary cell failure to the network-side device, and processes a bearer and a cell corresponding to the Radio Link Control (RLC) entity in which the secondary cell failure occurs. In this way, through pre-configuration, the terminal-side device can report information when the secondary cell failure occurs, and process the bearer and the cell corresponding to the Radio Link Control (RLC) entity in which the secondary cell failure occurs, so that the network-side device may obtain relevant information of the secondary cell failure occurred in the radio bearer, whereby subsequent processing can be performed on the secondary cell failure of the radio bearer, and the terminal-side device can stop signal transmission and reception of a cell corresponding to the failed RLC entity. Thus, power and other resources of the terminal-side device can be saved and interference to other terminal-side device can be avoided.

In the 1990s, improvements to a technology can be clearly distinguished to be improvements in hardware (e.g., improvements to a circuit structure such as diodes, transistors, switches, etc.) or improvements in software (improvements to a process flow). However, with the development of technology, many improvements of a method flow nowadays can be regarded as a direct improvement of a hardware circuit structure. Almost all designers obtain the corresponding hardware circuit structure by programming the improved method flow into a hardware circuit. Therefore, it cannot be concluded that the improvement of a method flow cannot be realized by a hardware entity module. For example, a programmable logic device (Programmable Logic Device, PLD), such as a field programmable gate array (Field Programmable Gate Array, FPGA), is an integrated circuit whose logic function is determined by a user who programming the device. The designer programming to "integrate" a digital system onto a piece of PLD without having to ask a chip manufacturer to design and fabricate an application specific integrated circuit chip. Today, instead of making an integrated circuit chip by hand, this programming is most likely implemented by using a "logical compiler" software which is similar to software compilers used in programming, and an original code before compilation has to be written in a specific programming language, called a hardware description language (Hardware Description Language, HDL), and HDL is not just one type, but many types. For example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. VHDL (Very-High-Speed Integrated Circuit Hardware Description Language) and Verilog are commonly used in the related art. It should also be apparent to those skilled in the art that a hardware circuit implementing a logic method flow can be readily obtained by slightly performing a logic programming and by programming the method flow into an integrated circuit, using the above described several hardware description languages.

A controller may be implemented in any suitable manner, for example, the controller may take forms of a microprocessor or a processor and a computer readable medium storing a computer readable program code (e.g., software or firmware) executable by the (microprocessor) processor, logic gates, switches, application specific integrated circuits (Application Specific Integrated Circuit, ASIC), programmable logic controllers and embedded microcontrollers. Examples of the controller include, but are not limited to, ARC 625D, Atmel AT91SAM, Microchip PIC18F26K20, and Silicone Labs C8051F320. A controller of a storage may also be implemented as part of a control logic of the storage. It is also known for those skilled in the art, besides implementing the controller by means of a computer readable program code only, it is entirely possible to perform a logic programming on the steps of the method, to enable the controller to perform the same functions in forms of logic gates, switches, Application Specific Integrated Circuits, programmable logic controllers, embedded microcontrollers, etc. Such a controller may therefore be considered as a hardware component, and a device for implementing various functions included in the controller may also be considered as a structure in in the hardware component. Additionally, the device for implementing various functions may be regarded as a software module for implementing a method and/or a structure within the hardware component.

Systems, devices, modules or units set forth in the above embodiments may in particular be implemented by computer chips or entities, or by products having certain functions. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For convenience of description, the above devices are described separately by dividing functions thereof into various units, respectively. Of course, the functions of the units may be implemented in the same software and/or hardware when implementing the present application.

Those skilled in the art will appreciate that the embodiments of the present application may be provided as methods, systems, or computer program products. Accordingly, the present application may take forms of a full hardware embodiment, a full software embodiment, or an embodiment combining with software and hardware aspects. Moreover, the present application may employ a form of a computer program product implemented on one or more computer-usable storage media (including, but not limited to, a magnetic disk storage, a compact disc read-only memory (Compact Disc Read-Only Memory, CD-ROM), an optical storage) containing a computer-usable program code.

The present application is described with reference to a flowchart and/or a block diagram of a method, a device (a system), and a computer program product according to some embodiments of the present application. It should be understood that each of the flows and/or blocks in the flowchart and/or block diagram, as well as a combination of the flows and/or blocks in the flowchart and/or block diagram, may be implemented by computer program instructions. These computer program instructions may be provided to a processor of a general purpose computer, a special purpose computer, an embedded processor, or other programmable data processing devices to produce a machine, so that instructions executed by a processor of a computer or other programmable data processing device generate a means for implementing functions specified in one or more flows of a flowchart or one or more blocks of a block diagram.

These computer program instructions may also be stored in a computer readable memory capable of directing a computer or other programmable data processing device to operate in a particular manner, causing an instruction stored in the computer readable memory to generate an article of manufacture including an instruction device, the instruction device implements the functions specified in one or more flows of a flowchart or one or more blocks of a block diagram.

These computer program instructions may also be loaded onto a computer or other programmable data processing device such that a series of operational steps are performed on the computer or other programmable device to produce a computer-implemented process, so that instructions executed on the computer or other programmable device provide steps for implementing the functions specified in one or more flows of a flowchart or one or more blocks of a block diagram.

In a typical configuration, a computing device includes one or more central processing units (Central Processing Unit, CPU), input/output interfaces, network interfaces, and memories.

A memory may include a non-permanent memory, a random access memory (RAM), and/or a non-volatile memory in a computer readable medium, such as a read only memory (ROM) or a flash RAM. The memory is an example of a computer readable medium.

A computer readable media includes permanent and non-permanent media, or removable and non-removable media which may implement information storage by any method or technique. The information may be computer readable instructions, data structures, program modules, or other data. Examples of computer storage media include, but are not limited to, a phase change random access memory (Phase Change Random Access Memory, PRAM), a static random access memory (Static Random Access Memory, SRAM), a dynamic random access memory (Dynamic Random Access Memory, DRAM), other types of random access memory (Random Access Memory, RAM), a read only memory (Read Only Memory, ROM), an electrically erasable programmable read only memory (Electrically Erasable Programmable Read Only Memory, EEPROM), a flash memory or other memory technology, a Compact-Disc ROM (Compact-Disc ROM, CD-ROM), a digital video disc (Digital Video Disc, DVD) or other optical storage, a magnetic tape cartridge, a Magnetic tape magnetic disk storage or other magnetic storage devices or any other non-transport medium may be used to store information accessible by a computing device. As defined herein, computer readable media do not include transitory computer readable media, such as modulated data signals and carriers.

It should also be noted that such term as "include", "comprise" or any other variant thereof is intended to cover non-exclusive inclusion, so that processes, methods, goods or devices including a series of elements include not only those elements but also other elements which are not explicitly listed, or may also include elements inherent to such processes, methods, goods, or devices. In absence of more restrictions, an element after a statement "including one" is not excluded from coexistence of additional identical elements in a process, a method, goods, or a device that includes the element.

Those skilled in the art will appreciate that the embodiments of the present application may be provided as methods, systems, or computer program products. Accordingly, the present application may take forms of a full hardware embodiment, a full software embodiment, or an embodiment incorporating software and hardware aspects. Moreover, the present application may employ a form of a computer program product implemented on one or more computer-usable storage media (including, but not limited to, a magnetic disk storage, a compact disc read-only memory (Compact Disc Read-Only Memory, CD-ROM), an optical storage) containing a computer-usable program code.

The present application may be described in a general context of computer executable instructions executed by a computer, such as program modules. Generally, program modules include routines, programs, objects, components, data structures, and the like that perform a particular task or implement a particular abstract data type. The present application may also be practiced in distributed computing environments in which tasks are performed by remote processing devices connected through a communication network. In a distributed computing environment, program modules may be located in local and remote computer storage media, including storage devices.

The various embodiments in this specification are described in a progressive manner, the same similar parts between the various embodiments may be referred to each other, and each embodiment is mainly described in respect of difference from the other embodiments. In particular, description of a system embodiment is relatively simple due to the description of the system embodiment being similar to that of the method embodiment, and thus a related part between the system embodiment and the method embodiment may be obtained by referring to related description of the method embodiment.

The above description are only embodiments of the present application and is not intended to limit the present application. Various modifications and variations may be made to the present application by those skilled in the art. Any modification, equivalent substitution, improvement, etc. made within the spirit and principles of this application shall be included within the scope of the claims of this application.

What is claimed is:

1. A data processing method, applied to a terminal-side device, the method comprising:
    obtaining configuration information, wherein the configuration information is used for indicating that information is to be reported when a secondary cell failure occurs;
    when the secondary cell failure occurs in a radio bearer of the terminal-side device, reporting relevant information of the secondary cell failure to a network-side device;
    wherein reporting the relevant information of the secondary cell failure to the network-side device comprises:
    directly reporting the relevant information of the secondary cell failure to a Secondary Node (SN) through a Signaling Radio Bearer 3 (SRB3) of a Secondary Cell Group (SCG), in case the secondary cell failure occurs in the SCG; or
    reporting the relevant information of the secondary cell failure to a Master Node (MN) through a Signaling Radio Bearer 1 (SRB1) of a Master Cell Group (MCG) so that the MN sends the relevant information of the secondary cell failure to a Secondary Node (SN), in case the secondary cell failure occurs in the MCG;
    the relevant information of the secondary cell failure comprises,
    a cell group identifier of a cell group in which the secondary cell failure occurs and a logical channel identifier corresponding to a Radio Link Control (RLC) entity to which the secondary cell failure occurs.

2. The method according to claim 1, further comprising:
    processing a bearer and a cell corresponding to a Radio Link Control (RLC) entity to which the secondary cell failure occurs.

3. The method according to claim 1, wherein the configuration information is information, configured by the network-side device or agreed by a communication protocol, about whether information is to be reported when the secondary cell failure occurs.

4. The method according to claim 1, wherein the radio bearer to which the secondary cell failure occurs, comprises at least one of a Signaling Radio Bearer (SRB) or a Data Radio Bearer (DRB).

5. The method according to claim 4, wherein the Signaling Radio Bearer (SRB), to which the secondary cell failure occurs, of the terminal-side device is a Signaling Radio Bearer (SRB), to which the secondary cell failure occurs, in a Master Cell Group (MCG) of the terminal-side device;

processing the bearer and the cell corresponding to the Radio Link Control (RLC) entity to which the secondary cell failure occurs comprises one or more of following:

re-establishing a Radio Link Control (RLC) entity to which a secondary cell failure occurs;

re-establishing a Radio Link Control (RLC) entity corresponding to a secondary cell corresponding to an RLC entity to which a secondary cell failure occurs;

deactivating a secondary cell corresponding to a Radio Link Control (RLC) entity to which a secondary cell failure occurs;

stopping uplink signal transmission in a secondary cell corresponding to a Radio Link Control (RLC) entity to which a secondary cell failure occurs;

stopping downlink signal reception in a secondary cell corresponding to a Radio Link Control (RLC) entity to which a secondary cell failure occurs;

deactivating a Packet Data Convergence Protocol (PDCP) data duplication function;

if a default transmission path of a Signaling Radio Bearer (SRB) configured with a Packet Data Convergence Protocol (PDCP) data duplication function is a transmission path corresponding to a Radio Link Control (RLC) entity to which a secondary cell failure occurs, modifying the default transmission path as a transmission path corresponding to a Radio Link Control (RLC) entity to which a secondary cell failure has not occurred;

if all Radio Link Control (RLC) entities of a Signaling Radio Bearer (SRB) configured with a Packet Data Convergence Protocol (PDCP) data duplication function fail, and all of the Radio Link Control (RLC) entities are configured to transmit on the secondary cell, then suspending a bearer configured with the PDCP data duplication function;

if all Radio Link Control (RLC) entities of a Signaling Radio Bearer (SRB) configured with a Packet Data Convergence Protocol (PDCP) data duplication function fail, and all of the Radio Link Control (RLC) entities are configured to transmit on a secondary cell, then re-establishing a PDCP entity corresponding to a bearer configured with the PDCP data duplication function;

if all Radio Link Control (RLC) entities of a Signaling Radio Bearer (SRB) configured with a Packet Data Convergence Protocol (PDCP) data duplication function fail, and all of the Radio Link Control (RLC) entities are configured to transmit on a secondary cell, then resetting a Media Access Control (MAC) entity corresponding to a bearer configured with the PDCP data duplication function;

if all Radio Link Control (RLC) entities of a Signaling Radio Bearer (SRB) configured with a Packet Data Convergence Protocol (PDCP) data duplication function fail, and all of the Radio Link Control (RLC) entities are configured to transmit on a secondary cell, then triggering a Radio Resource Control (RRC) connection re-establishment process;

suspending a Radio Link Control (RLC) entity to which a secondary cell failure occurs;

re-establishing a Radio Link Control (RLC) entity to which a secondary cell failure occurs, and suspending the Radio Link Control (RLC) entity;

suspending a Signaling Radio Bearer (SRB) to which a secondary cell failure occurs;

re-establishing a Signaling Radio Bearer (SRB) to which a secondary cell failure occurs, and, suspending the Signaling Radio Bearer (SRB);

stopping data transmission or data reception of a Radio Link Control (RLC) entity to which a secondary cell failure occurs;

releasing or deleting a Radio Link Control (RLC) entity to which a secondary cell failure occurs.

6. The method according to claim 5, wherein a type of a Signaling Radio Bearer (SRB) to which a secondary cell failure occurs comprises one or more of SRB0, SRB1, and SRB2.

7. The method according to claim 4, wherein the Signaling Radio Bearer (SRB), to which the secondary cell failure occurs, of the terminal-side device is a Signaling Radio Bearer (SRB), to which the secondary cell failure occurs, in a Secondary Cell Group (SCG) of the terminal-side device, processing the bearer and the cell corresponding to the Radio Link Control (RLC) entity to which the secondary cell failure occurs, comprises one or more of following:

re-establishing a Radio Link Control (RLC) entity to which a secondary cell failure occurs;

re-establishing a Radio Link Control (RLC) entity corresponding to a secondary cell corresponding to an RLC entity to which a secondary cell failure occurs;

deactivating a secondary cell corresponding to a Radio Link Control (RLC) entity to which a secondary cell failure occurs;

stopping uplink signal transmission in a secondary cell corresponding to a Radio Link Control (RLC) entity to which a secondary cell failure occurs;

stopping downlink signal reception in a secondary cell corresponding to a Radio Link Control (RLC) entity to which a secondary cell failure occurs;

deactivating a Packet Data Convergence Protocol (PDCP) data duplication function;

if a default transmission path of a Signaling Radio Bearer (SRB) configured with a Packet Data Convergence Protocol (PDCP) data duplication function is a transmission path corresponding to a Radio Link Control (RLC) entity to which a secondary cell failure occurs, modifying the default transmission path as a transmission path corresponding to a Radio Link Control (RLC) entity to which a secondary cell failure has not occurred;

if all Radio Link Control (RLC) entities of a Signaling Radio Bearer (SRB) configured with a Packet Data Convergence Protocol (PDCP) data duplication function fail, and all of the Radio Link Control (RLC) entities are configured to transmit on a secondary cell, then suspending a bearer configured with the PDCP data duplication function;

if all Radio Link Control (RLC) entities of a Signaling Radio Bearer (SRB) configured with a Packet Data Convergence Protocol (PDCP) data duplication function fail, and all of the Radio Link Control (RLC) entities are configured to transmit on a secondary cell, then re-establishing a PDCP entity corresponding to a bearer configured with a PDCP data duplication function;

if all Radio Link Control (RLC) entities of a Signaling Radio Bearer (SRB) configured with a Packet Data Convergence Protocol (PDCP) data duplication function fail, and all of the Radio Link Control (RLC)

entities are configured to transmit on a secondary cell, then resetting a Media Access Control (MAC) entity corresponding to a bearer configured with the PDCP data duplication function;

if all Radio Link Control (RLC) entities of a Signaling Radio Bearer (SRB) configured with a Packet Data Convergence Protocol (PDCP) data duplication function fail, and all of the Radio Link Control (RLC) entities are configured to transmit on a secondary cell, then triggering a report process of a Secondary Cell Group (SCG) failure;

suspending a Radio Link Control (RLC) entity to which a secondary cell failure occurs;

re-establishing a Radio Link Control (RLC) entity to which a secondary cell failure occurs, and, suspending the Radio Link Control (RLC) entity;

suspending a Signaling Radio Bearer (SRB) to which a secondary cell failure occurs;

re-establishing a Signaling Radio Bearer (SRB) to which a secondary cell failure occurs, and, suspending the Signaling Radio Bearer (SRB);

stopping data transmission or data reception of a Radio Link Control (RLC) entity to which a secondary cell failure occurs;

releasing or deleting a Radio Link Control (RLC) entity to which a secondary cell failure occurs.

8. The method according to claim 7, wherein a type of a Signaling Radio Bearer (SRB) to which a secondary cell failure occurs comprises one or more of SRB0, SRB1, SRB2, and SRB3.

9. The method according to claim 4, wherein a secondary cell failure occurs to a Data Radio Bearer (DRB) of the terminal-side device, processing the bearer and the cell corresponding to a Radio Link Control (RLC) entity to which the secondary cell failure occurs, comprises one or more of following:

suspending a Radio Link Control (RLC) entity to which a secondary cell failure occurs;

re-establishing a Radio Link Control (RLC) entity to which a secondary cell failure occurs, and suspending the Radio Link Control (RLC) entity;

suspending a Data Radio Bearer (DRB) to which a secondary cell failure occurs;

re-establishing a Data Radio Bearer (DRB) to which a secondary cell failure occurs, and suspending the Data Radio Bearer (DRB);

stopping data transmission or data reception of a Radio Link Control (RLC) entity to which a secondary cell failure occurs;

releasing or deleting a Radio Link Control (RLC) entity to which a secondary cell failure occurs.

10. The method according to claim 1; wherein the relevant information of the secondary cell failure comprises one or more of following:

a cell identifier of a cell in which the secondary cell failure occurs;

a Radio Bearer (RB) identifier of a RB to which the secondary cell failure occurs;

a Radio Link Control (RLC) entity identifier of a RLC entity to which the secondary cell failure occurs;

a logical channel group identifier of a logical channel corresponding to a Radio Link Control (RLC) entity to which the secondary cell failure occurs;

a measurement result of a cell corresponding to a Radio Link Control (RLC) entity to which the secondary cell failure occurs;

a measurement result of all cells;

a measurement result of a cell in a cell group in which the secondary cell failure occurs;

a measurement result of a cell having non-serving frequencies.

11. The method according to claim 10, wherein the measurement results comprise one or more of following:

a measurement result of a cell or a measurement result of a beam of a cell.

12. The method according to claim 1, wherein after reporting the relevant information of the secondary cell failure to the network-side device, the method further comprises:

receiving target indication information sent by the network-side device;

resuming, according to the target indication information, data reception or data transmission of a Radio Link Control (RLC) entity to which the secondary cell failure occurs.

13. A non-transitory computer readable storage medium, comprising:

a computer program stored on the computer readable storage medium, wherein when the computer program is executed by the processor, the processor implements steps of the method according to claim 1.

14. A data processing method, applied to a network-side device, the method comprising:

receiving relevant information of a secondary cell failure reported by a terminal-side device when the secondary cell failure occurs in a radio bearer; performing reconfiguration processing on a secondary cell in which the secondary cell failure occurs;

wherein receiving the relevant information of the secondary cell failure reported by the terminal-side device, comprises:

receiving the relevant information of the secondary cell failure directly reported by the terminal-side device to a Secondary Node (SN) through a Signaling Radio Bearer 3 (SRB3) of a Secondary Cell Group (SCG), in case the secondary cell failure occurs in the SCG; or receiving the relevant information of the secondary cell failure reported by the terminal-side device to a Master Node (MN) through a Signaling Radio Bearer 1 (SRB1) of a Master Cell Group (MCG), so that the MN sends the relevant information of the secondary cell failure to a Secondary Node (SN), in case the secondary cell failure occurs in the MCG;

the relevant information of the secondary cell failure comprises, a cell group identifier of a cell group in which the secondary cell failure occurs and a logical channel identifier corresponding to a Radio Link Control (RLC) entity to which the secondary cell failure occurs.

15. The method according to claim 14, wherein after performing the reconfiguration processing on the secondary cell in which the secondary cell failure occur, the method further comprises:

sending target indication information to the terminal-side device, wherein the target indication information is used by the terminal-side device to resume data reception or data transmission of a Radio Link Control (RLC) entity to which the secondary cell failure occurs;

wherein the target indication information comprises one or more of following:

a re-establishment indication of an RLC entity to which a secondary cell failure occurs, first RRC reconfiguration information after reporting the relevant information of the secondary cell failure,
an identifier of a recovered RLC entity,
a logical channel identifier corresponding to a recovered RLC entity,
a bearer identifier corresponding to a recovered RLC entity,
a cell identifier corresponding to a recovered RLC entity, and
a cell group identifier corresponding to a recovered RLC entity.

16. The network-side device, comprising:
a storage, a processor, and a computer program stored on the storage and executable by the processor, wherein when the computer program is executed by a processor, the processor implements steps of the method according to claim 14.

17. A non-transitory computer readable storage medium, comprising:
a computer program stored on the computer readable storage medium, wherein when the computer program is executed by the processor, the processor implements steps of the method according to claim 14.

18. A terminal-side device, comprising:
a storage, a processor, and a computer program stored on the storage and executable by the processor, wherein when the computer program is executed by a processor, the processor implements a data processing method, the method comprises:
obtaining configuration information, wherein the configuration information is used for indicating that information is to be reported when a secondary cell failure occurs;
when the secondary cell failure occurs in a radio bearer of the terminal-side device, reporting relevant information of the secondary cell failure to a network-side device;
wherein reporting the relevant information of the secondary cell failure to the network-side device comprises:
directly reporting the relevant information of the secondary cell failure to a Secondary Node (SN) through a Signaling Radio Bearer 3 (SRB3) of a Secondary Cell Group (SCG), in case the secondary cell failure occurs in the SCG; or
reporting the relevant information of the secondary cell failure to a Master Node (MN) through a Signaling Radio Bearer 1 (SRB1) of a Master Cell Group (MCG) so that the MN sends the relevant information of the secondary cell failure to a Secondary Node (SN), in case the secondary cell failure occurs in the MCG;
the relevant information of the secondary cell failure comprises,
a cell group identifier of a cell group in which the secondary cell failure occurs and a logical channel identifier corresponding to a Radio Link Control (RLC) entity to which the secondary cell failure occurs.

* * * * *